United States Patent
Yoshida et al.

(10) Patent No.: US 6,581,118 B2
(45) Date of Patent: Jun. 17, 2003

(54) APPARATUS AND METHOD FOR DETERMINING BUS USE RIGHT

(75) Inventors: Hiroyoshi Yoshida, Fujisawa (JP); Ritsuko Otake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/237,031

(22) Filed: Sep. 9, 2002

(65) Prior Publication Data

US 2003/0038969 A1 Feb. 27, 2003

Related U.S. Application Data

(62) Division of application No. 09/203,359, filed on Dec. 2, 1998, now Pat. No. 6,473,816.

(30) Foreign Application Priority Data

Dec. 4, 1997 (JP) .............................. 9-348695
Dec. 19, 1997 (JP) .............................. 9-364397

(51) Int. Cl.[7] .......................... G06F 9/00; G06F 13/14
(52) U.S. Cl. .................. 710/240; 710/241; 710/305; 709/102
(58) Field of Search ................................ 710/240, 241, 710/244, 63, 305; 709/100, 102; 700/32; 101/2; 358/1.1, 403; 711/100; 382/62

(56) References Cited

U.S. PATENT DOCUMENTS

| 4,803,681 | A | | 2/1989 | Takahashi |
| 5,377,332 | A | | 12/1994 | Entwistle et al. |
| 5,473,762 | A | | 12/1995 | Krein et al. |
| 5,727,210 | A | * | 3/1998 | Dwork et al. |
| 5,774,356 | A | | 6/1998 | Hisatake et al. |
| 5,802,161 | A | | 9/1998 | Svoronos et al. |
| 6,038,628 | A | | 3/2000 | Leung et al. |
| 6,065,036 | A | * | 5/2000 | Hisatake |
| 6,128,711 | A | | 10/2000 | Duncan et al. |
| 6,271,927 | B1 | | 8/2001 | Kohtani et al. |

* cited by examiner

Primary Examiner—Gopal C. Ray
(74) Attorney, Agent, or Firm—Fitzpatrick, Cella, Harper & Scinto

(57) ABSTRACT

In order to efficiently utilize a bus system, when a new job occurs, the preferences assigned to jobs is determined in accordance with the volumes of the data remaining for unprocessed jobs, and the job that has been determined to have the highest preference is permitted to use the bus. In addition, when a new job occurs, for unprocessed jobs, job preferences are determined in accordance with a necessary channel count x necessary cycle count value, and a job that is determined to have the highest preference is permitted to use the bus. Furthermore, the nodes are managed so as to specify the order in which the bus can be obtained, and the node that used the bus the latest is permitted to use the bus.

8 Claims, 34 Drawing Sheets

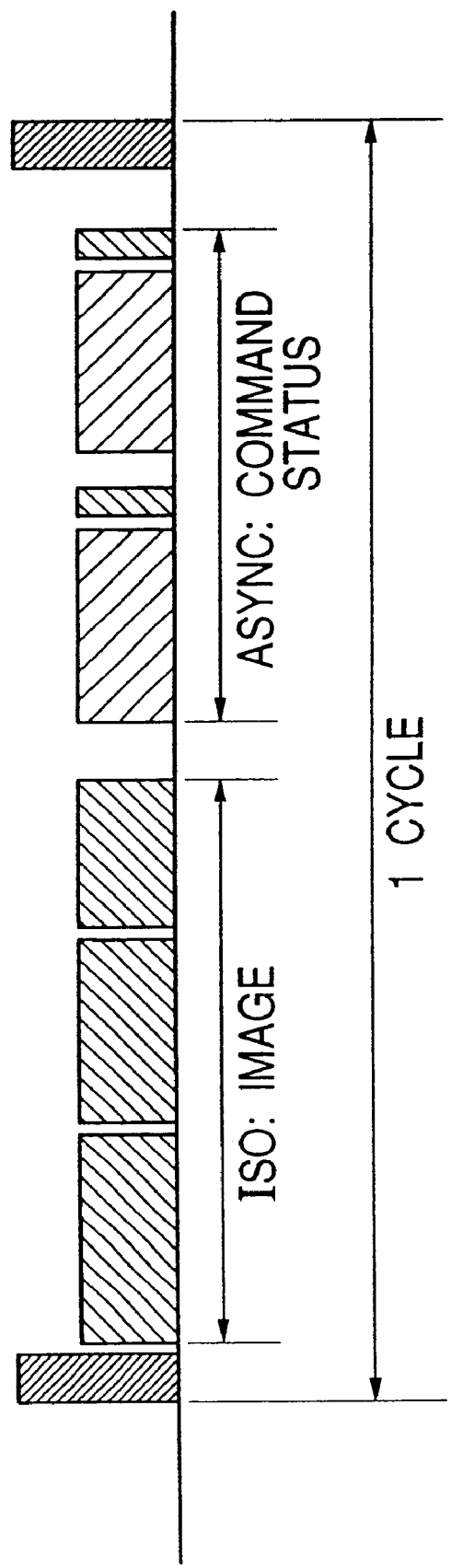

FIG. 24

| JOB ID | DATA AMOUNT | DATA TRANSMISSION SPEED |
|---|---|---|
| 5 | 10 | 1 |
| 3 | 20 | 1 |
| 18 | 40 | 1 |
| 22 | 100 | 1 |
| 10 | 200 | 1 |
| 7 | 400 | 1 |

FIG. 25

| JOB ID | NO. OF CHANNELS | NO. OF CYCLES | NO. OF CHANNELS × NO. OF CYCLES |
|---|---|---|---|
| A | 6 | 10 | 60 |
| B | 5 | 5 | 25 |
| C | 4 | 20 | 60 |
| D | 10 | 10 | 100 |

TOTAL EXECUTION TIME: 95

TOTAL EXECUTION TIME: 70

APPARATUS AND METHOD FOR DETERMINING BUS USE RIGHT

This application is a division of application Ser. No. 09/203,359, filed on Dec. 2, 1998, U.S. Pat. No. 6,473,816.

BACKGROUND OF THE INVENTION

1. Field of the Invention

The present invention relates to an apparatus and method for determining the right of use of a bus, such as an IEEE 1394 serial bus.

2. Related Background Art

Various image processing apparatuses and systems are known that transmit command statuses via a serial bus to a plurality of modules or to a plurality of apparatuses.

In addition, for the transmission of binary monochromatic image data, which has a comparatively small, image processing apparatuses and systems are well known that transmit image data and command statuses via a serial bus.

However; when taking into account the transmission of color image data, which has a comparatively large volume, or the occurrence of a plurality of jobs for each of which the transmission of image data is required, the conventional transmission of data performed via a serial bus is not practical because the amount of data that can be transmitted in a unit hour is small, and accordingly, the transmission of data requires an extended period of time.

This problem can be resolved to a degree by increasing the transmission speed of the serial bus. However, when the conventional serial bus is employed for an image processing apparatus, such as a copier, for which real-time image data transmission is required, the intermittent command status transmissions that occur interfere with the transmission of image data, and a time by which the transmission of image data can be completed can not reliably be ascertained. Thus, as it is difficult for a serial data bus to be employed for an image processing apparatus for image data transmissions, a dedicated parallel bus must be used this purpose.

On the other hand, since there is an increased demand for a reduction in the sizes of such products as copiers, which are generally used in offices, and concurrently a request that their functions be improved, internally these common office products do not have enough space to accommodate a dedicated parallel bus to be used only for the communication of image data.

SUMMARY OF THE INVENTION

To resolve the above shortcomings, it is one objective of the present invention to provide an image processing apparatus and an image processing system that can perform the steady, high speed transmission of image data via a serial bus, even when command statuses and a comparatively large quantity of color image data must be transmitted, or even when conflicts develop among a plurality of jobs for which the transmission of image data is required.

To achieve the above objective, according to the present invention an image processing apparatus, which connects together a plurality of modules via a high-speed serial bus along which at least one isochronous packet and at least one asynchronous packet, which are assigned for a predetermined number of channels, can be sequentially transmitted during a single transmission cycle, and which transmits image data to the plurality of modules by assigning to the isochronous packet the transmission to the modules of image data and by assigning to the asynchronous packet the transmission of a command status, comprises:

determination means for, when a plurality of jobs, including the transmission of image data, are pending, determining whether the number of channels available in one cycle is adequate for the number of pending jobs;

preference determination means for, when the determination means ascertains that the number of channels available is not adequate, determining preferences to be assigned to jobs in accordance with the periods of time required to execute the jobs; and change means for dynamically changing the execution timings for the jobs in accordance with the preferences determined by the preference determination means.

Furthermore, to achieve the above objective, according to the present invention, provided is an image processing apparatus, which connects together a plurality of modules, via a high-speed serial bus along which at least one isochronous packet and at least one asynchronous packet, which are assigned for each of a predetermined number of channels, can be sequentially transmitted in one transmission cycle, and which transmits image data to the plurality of modules by assigning an isochronous packet for the transmission of image data to the modules and by assigning an asynchronous packet for the transmission of a command status to the modules, wherein a module that performs the transmission of image data requests a right of use for the high-speed serial bus before beginning a transmission and transmits the image data only after obtaining the right of use for the high-speed serial bus, and wherein an arbiter is provided that, when the right of use for the high-speed serial bus is requested by two or more modules, assigns the right of use for the high-speed serial bus first to a specific module selected from among the requesting modules.

BRIEF DESCRIPTION OF THE DRAWINGS

FIG. 21 is a specific explanatory diagram showing a bus cycle during which a plurality of channels are used for an image communication packet that is composed of image data and for an Async packet that is used for the communication of commands or statuses among modules;

FIG. 24 is an explanatory diagram showing an example job table;

FIG. 25 is a job table according to a second embodiment of the present invention for explaining a job preference setting method for a printing system comprising an image processing apparatus;

DETAILED DESCRIPTION OF THE PREFERRED EMBODIMENTS

First Embodiment

A first embodiment of the present invention will now be described while referring to FIGS. 1 to 24.

In this embodiment, an image processing system is constituted by a plurality of apparatuses, for example, a plurality of host computers and a plurality of printers, and the IEEE1394-1995 (hereinafter referred to simply as a 1394 serial bus) is adopted as the digital interface to be used for connecting these apparatuses.

An explanation will be given for the 1394 serial bus. In response to the introduction of digital VCRs and DVD players for public use, support is being requested for the real-time transmission of large amounts of such data as video data and audio data. In order to respond to this request, a fast data transmission interface is required across which video data and audio data can be transmitted and fetched in real time by a personal computer. Further, in order to transmit data to another digital apparatus, a fast data transmission interface is desired that has a requested transmission function. It is with such a viewpoint in mind that the 1394 serial bus was developed.

Figure 1:
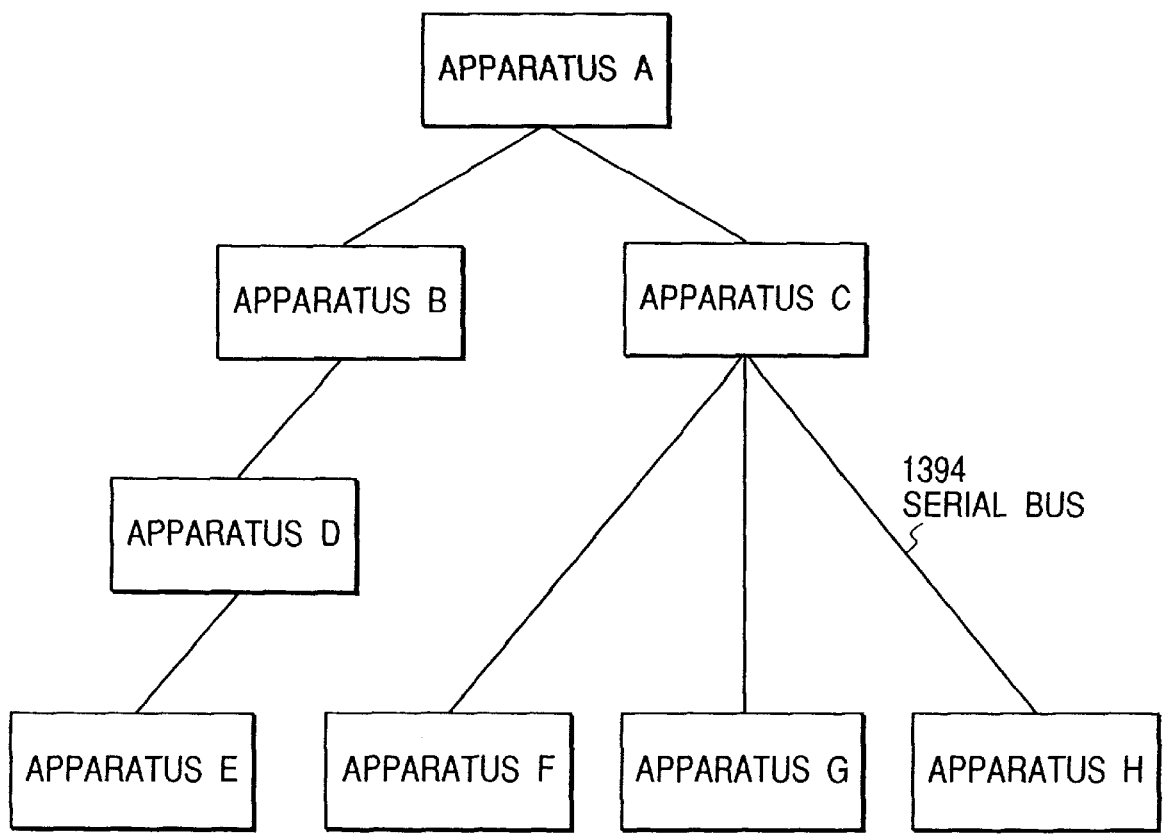
FIG. 1 is an explanatory diagram showing one example network system using the IEEE 1394-1995 (1394 serial bus) according to a first embodiment of the present invention.

FIG. 1 is a diagram for explaining an example network system constituted by using the 1394 serial bus.

The network system includes digital apparatuses A through H, a twisted pair cable composed of a 1394 serial bus connecting apparatuses A and B, B and D, D and E, C and F, C and G, and C and H. These digital apparatuses A to H are, for example, a personal computer, a digital VTR, a DVD player, a digital camera, a hard disk drive, a monitor, and a tuner.

A combination of the daisy chain method and the node branching method can be employed for connecting the digital apparatuses A to H, so that a connection having a high degree of freedom can be obtained.

The digital apparatuses A to H have their inherent IDs, and mutually identify the IDs constituting a network within the range within which they are connected by the 1394 serial bus. The digital apparatuses A to H serve as relays simply by being connected in sequence using a single 1394 serial bus cable, and the entire configuration constitutes a single network. The 1394 serial bus has a "Plug&Play function", i.e., a function for, when the cable is connected to an apparatus, automatically identifying the apparatus type and the connection state.

When an apparatus is deleted from the network system in FIG. 1, or a new apparatus is added thereto, the 1394 serial bus is automatically reset, the previous network function is reset, and a new network is built. Because of this function, the configuration of the network can be always maintained and the components identified.

The data transmission speeds are 100 Mbps, 200 Mbps and 400 Mbps, and for compatibility, an apparatus having a higher transmission speed can support an apparatus having a lower transmission speed.

The data transmission modes are the asynchronous transmission mode for the transmission of asynchronous data, such as control signals, and the isochronous transmission mode for the transmission of synchronous data, such as video data and audio data. After a cycle start packet (hereinafter referred to as a "CSP") that indicates the start of the cycle has been transmitted, asynchronous data and isochronous data are transmitted together in a single cycle (normally a cycle is 125 micro seconds), with the transmission of isochronous data taking place before the transmission of the asynchronous data.

Figure 2:
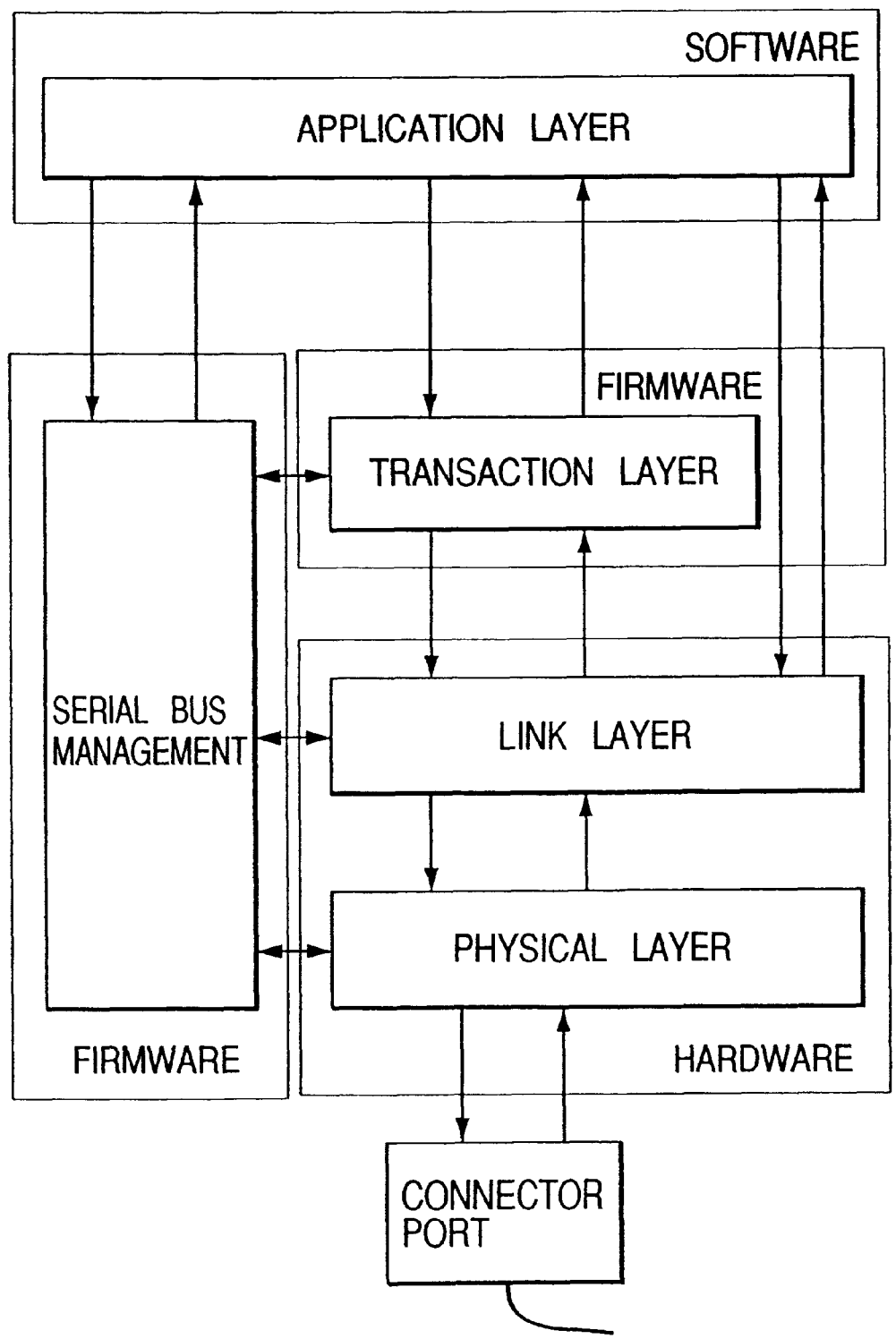
FIG. 2 is an explanatory diagram showing the structure of the 1394 serial bus.

FIG. 2 is an explanatory diagram showing the structure of the 1394 serial bus.

As is shown in FIG. 2, the 1394 serial bus has a hierarchical (layer) structure. For the 1394 serial bus, a physical layer and a link layer that together constitute a hardware portion are positioned above a connector port whereat is attached the connector of the cable.

The hardware portion is substantially an interface chip, the physical layer performing the encoding and exercising the control associated with a connector, and the link layer performing the transmission of packets and providing the control for a cycle time.

A transaction layer in a firmware portion manages the data for a transaction and issues Read, Write and Lock commands. A management layer manages the connection statuses of the linked apparatuses and the IDs, and also manages the configuration of the network.

The hardware and the firmware portions substantially constitute the structure of the 1394 serial bus.

An application layer in a software portion, which differs depending on which software is to be used, specifies how data should be transmitted across the interface, and, for example, specifies a printer and the AVC protocol.

The structure of the 1394 serial bus has been explained.

Figure 3:
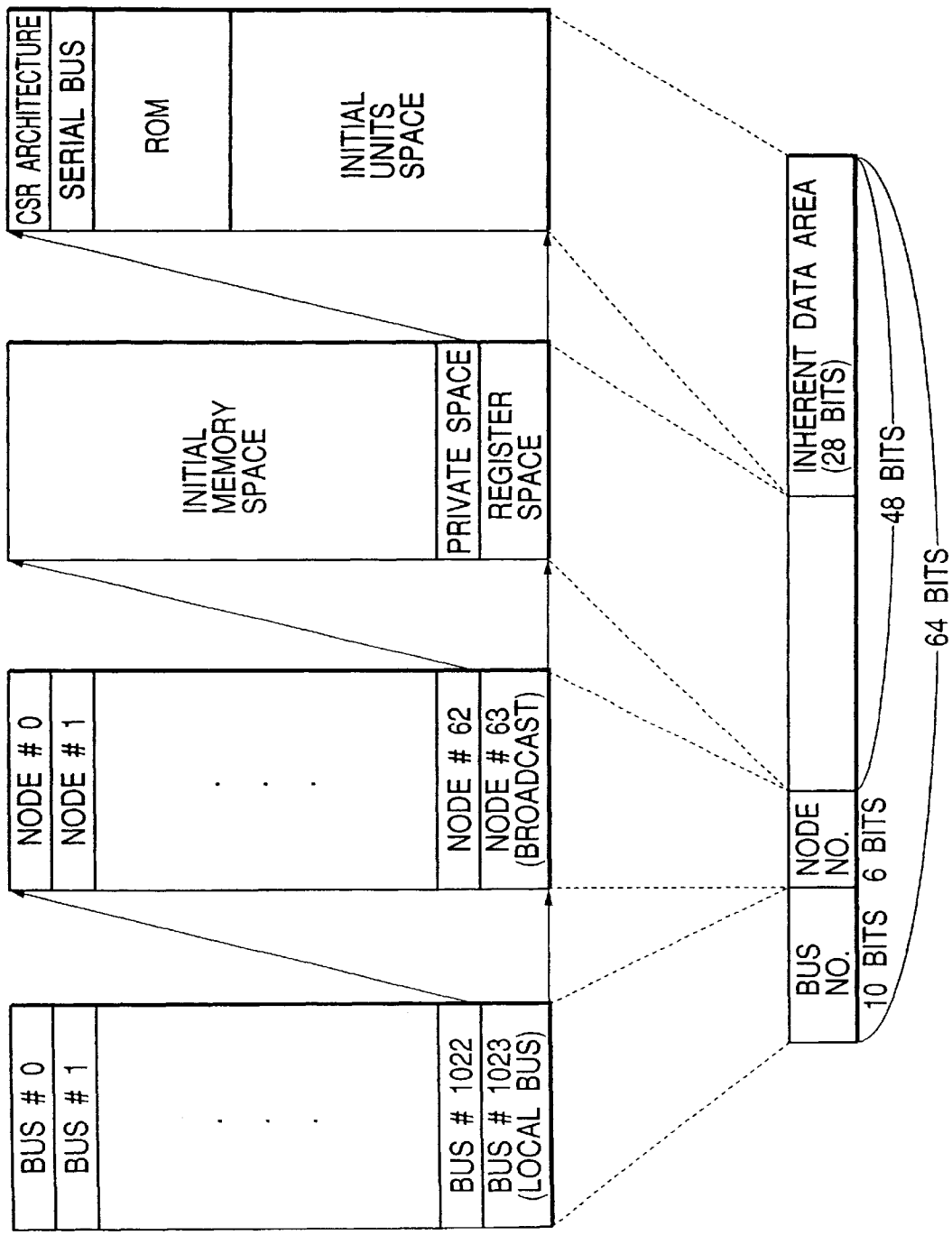
FIG. 3 is a diagram showing an address space for the 1394 serial bus.

FIG. 3 is a diagram showing an address space for the 1394 serial bus. A 64-bit address is allocated to each of the apparatuses (nodes) connected to the 1394 serial bus, and is inherent to each apparatus. When this address is stored in a ROM, a node address for a local apparatus or a communication destination apparatus can be readily identified, and communication with a designated destination can also be performed.

The addressing for the 1394 serial bus is performed in accordance with a method that conforms to the IEEE1212 standards. When setting up an address, the first ten bits are used to designate a bus number, and the following six bits are used to designate a node ID number. The remaining four bits are used as an address width that is provided for each of the apparatuses, and can be used as an inherent address space. The last 28 bits are used as an inherent data in which is stored predetermined information concerning the identification of the apparatuses and the condition of use.

The summary of the technique for the 1394 serial bus has been explained.

The technique that can be considered the feature of the 1394 serial bus will now be explained in more detail.

Figure 4:
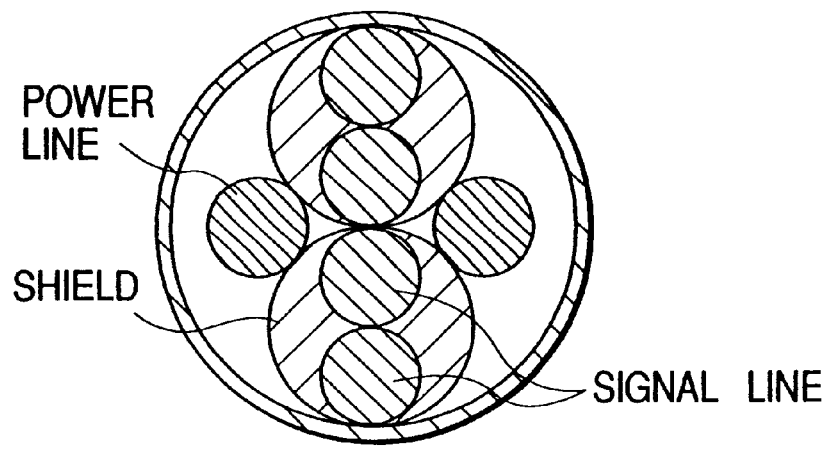
FIG. 4 is a cross-sectional view for explaining the electric specifications for the 1394 serial bus cable.

FIG. 4 is a cross-sectional view for explaining the electrical specifications for a 1394 serial bus cable.

As is shown in FIG. 4, a connection cable for the 1394 serial bus consists of six pins, i.e., two twisted pairs of shielded signal lines and two power lines. With this cable, power can be supplied to an apparatus that has no power source and an apparatus whose voltage has been reduced due to a failure.

The voltage carried by the power lines is a specified 8 to 40 V, with the maximum specified current being a DC 1.5 A one. According to the standards established for the DV cable, the cable has four outlet pins, excluding the pins used for power.

Figure 5:
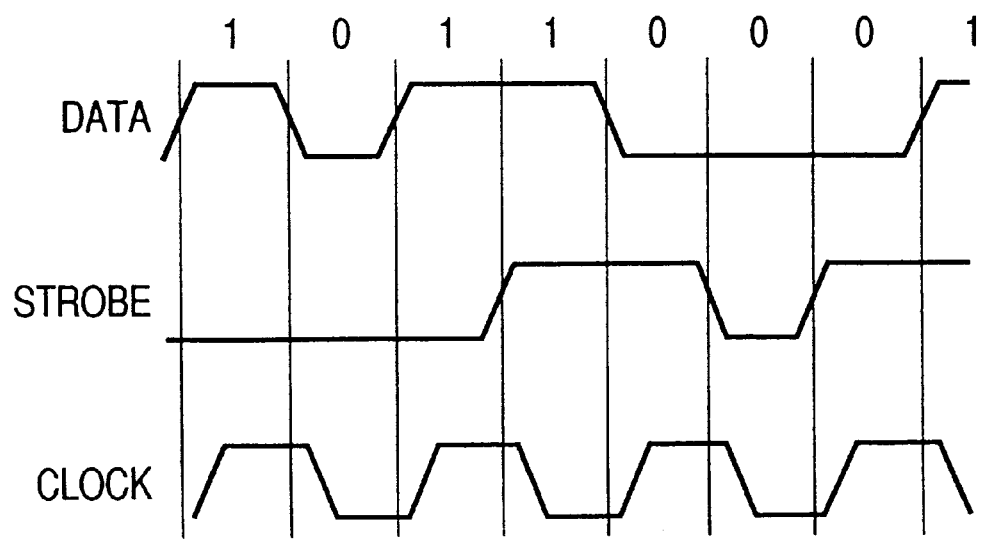
FIG. 5 is a diagram for explaining the DS-Link encoding system, which is a data transmission format used for the 1394 serial bus.

The DS (Data/Strobe)-Link encoding system will now be explained. FIG. 5 is a diagram for explaining the DS-Link encoding system that constitutes a data transmission format adopted for the 1394 serial bus.

The DS-Link encoding system is appropriate for fast serial data communication, and for its structure requires two twisted pair signal lines. Main data are transmitted along one of the twisted pair signal lines, and a strobe signal is transmitted along the other line. The reception side exclusive-ORs the data and the strobe signal that are received to reproduce a clock.

The merits provided by the DS-Link encoding system are: the transmission efficiency attained is higher than is that for an 8/10 B conversion; the circuit scale for a controller LSI can be reduced because a PLL circuit is not required; and since when there is no data to be transmitted information that indicates the existence of an idle state need not be transmitted, the transceiver for each apparatus can be set to the sleep state, and the consumption of power can be reduced.

The operating sequence for the resetting of a bus will now be described.

A node ID is provided for each of the apparatuses (nodes) that are connected to the 1394 serial bus in order to identify these apparatuses as the members of a network configuration.

When a network configuration is altered, for example, when the number of nodes is changed due to the insertion/removal of a node or due to a power ON/OFF state, and a new network must be identified, the nodes that have detected the change transmit bus reset signals via the bus, and then a mode is established for the identification of a new network configuration.

To detect the change, the nodes detect a change in the bias voltage on the 1394 substrate. Specifically, a node, upon receiving a bus reset signal from a specific node, performs the processing for the transmission to the link layer of the occurrence of a bus reset event and repeats the transmission of a bus reset signal to another node. When the bus reset signal has been detected by all the nodes, bus reset process is begun.

The bus reset process can be initiated by the connection/disconnection of a cable and by the hardware detection, for example, of an abnormality in a network, or by a command in accordance-with the protocol being issued directly to the physical layer through the host control.

When the bus reset process is initiated, the transmission of data is temporarily halted and suspended. When the bus reset has been completed, the transmission of data is resumed across a new network.

Figure 6:
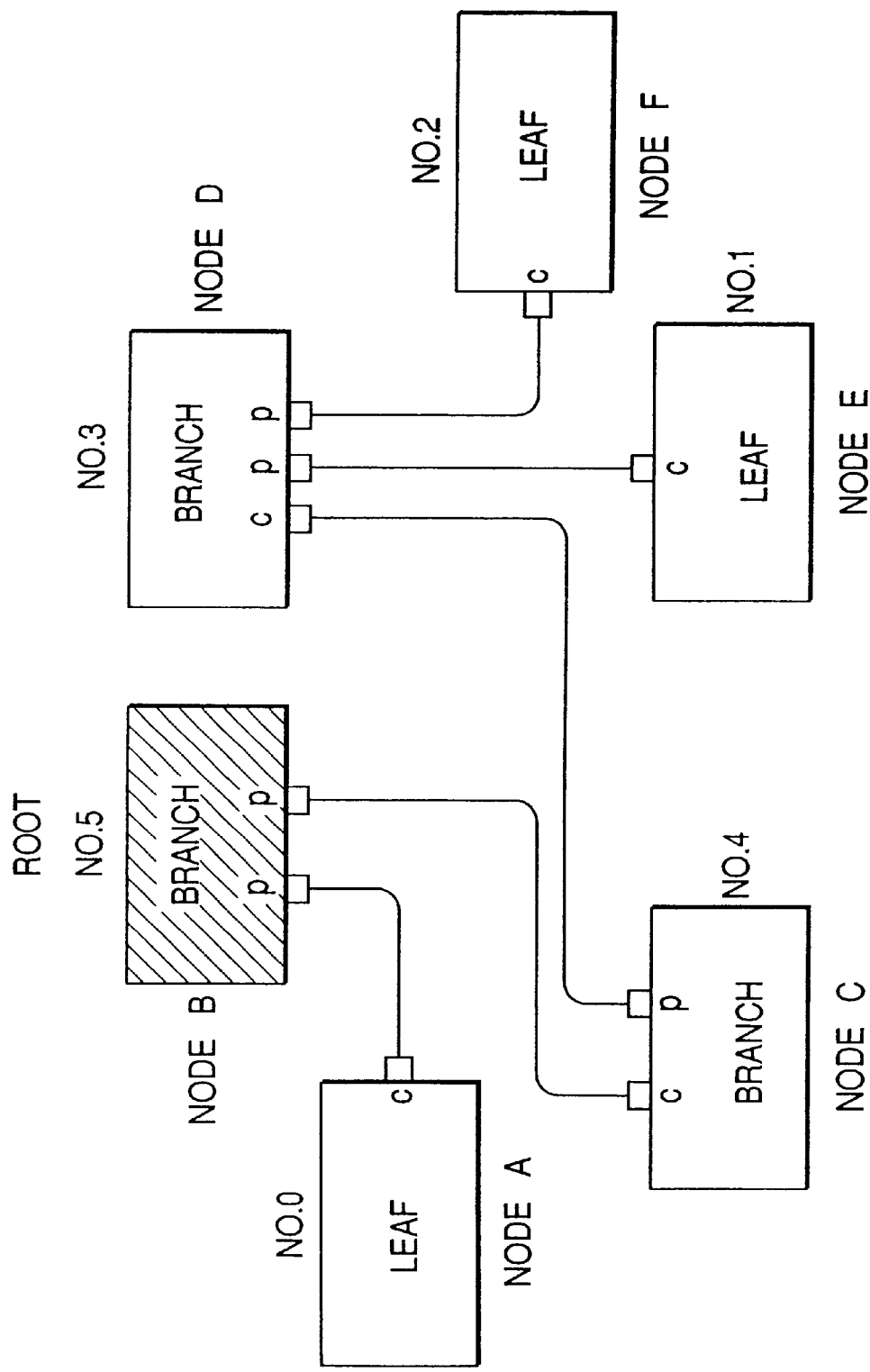
FIG. 6 is a specific explanatory diagram showing the node ID determination processing performed in an actual network.

FIG. 6 is a specific explanatory diagram showing the node ID determination processing for an actual network.

In this hierarchical structure, node A and node C are connected directly below node B (root), node D is connected directly below node C, and node E and node F are connected directly below node D. Ports to which the symbol "c" has been added correspond to "child" nodes, and ports to which the symbol "p" has been added correspond to "parent" nodes. A node connected to two or more ports is called a "branch", and a node connected to only one port is called a "leaf".

In FIG. 6, when the bus is reset, in order to identify the connection states for the individual nodes, a parent-child relationship is declared between the ports of the nodes that are directly connected. By "parent-child relationship" is meant the upper and the lower relationship in a hierarchical structure. The parent is in the upper rank in the hierarchical structure, while the child is in the lower rank.

Assume that node A first declared a parent-child relationship after the bus was reset. Specifically, basically, nodes having only one port connection (leaves) can first declare a parent-child relationship. This is because these nodes (leaves) can be the first to recognize that they have only one port connection. Accordingly, the leaves can understand that they are located at the ends of the network, and the parent-child relationship is determined beginning with the first node among them that initiates the operation. The port of a node that has declared a parent-child relationship (e.g., node A of nodes A and B) is determined to be a "child", and the port of the other node is determined to be a "parent". In this manner, the parent-child relationship "child—parent" is determined for nodes A and B, nodes E and D, and nodes F and D.

At one higher rank, the upper parent-child relationship is declared sequentially for the nodes (branches) that have a plurality of connections, beginning with a node that receives from another node the declaration of the parent-child relationship. That is, when the parent-child relationships for nodes D and E and for nodes D and F are determined, the parent-child relationship for node D to node C is declared. As a result, the relationship of nodes D and C is determined to be "child—parent".

Upon receiving the declaration of the parent-child relationship from node D, node C declares a parent-child relationship with node B, which is connected to the other port of node C. As a result, the parent-child relationship between nodes C and B is determined to be "child—parent".

In this manner, the hierarchical structure in FIG. 6 is constructed, until finally node B, which is the parent for all the rest of the linked nodes, is determined to be the root node. Only one root node exists in one network configuration.

In the example in FIG. 6, node B is determined to be the root node. However, if, upon receiving the declaration of the parent-child relationship from node A, node B declares the parent-child relationship to the other nodes earlier, another node may be selected to serve as the root node. That is, any node can be the root node, depending on the transmission timing, and the root node is not always a constant in the same network configuration.

When the root node is determined, the mode for determining the individual node IDs is initiated. In this mode, each node transmits to the remaining nodes of its individual node ID that has been determined (broadcast function).

In the ID information provided for a node is included the node ID number for the node, information concerning the connection position, and the number of ports available at the node and information concerning the parent-child relationship at each of the ports.

The node ID numbers are allocated first to those nodes (leaves) that have only one port connection. In this instance the node numbers 0, 1, . . . are allocated sequentially.

The node for which a node ID number has been determined broadcasts information to the other nodes that includes the node ID number. As a result, the node ID number is understood as having been "allocated".

When all the leaves have obtained their node ID numbers, the node ID numbers that follow the ID numbers assigned to the leaves are allocated for the branches. That is, as well as the leaves, branches for which node ID numbers have been allocated broadcast ID information that includes node ID numbers, until finally the root node broadcasts its own ID information. Therefore, the largest ID number is always assigned to the root.

When the node ID numbers for the entire hierarchical structure have been allocated, reconstruction of the network has been completed, and no further bus initialization is required.

The arbitration process will now be explained.

For the 1394 serial bus, the arbitration performed for the right of use of a bus is always completed before data is transmitted. The 1394 serial bus network is a logical bus network wherein the separately connected apparatuses relay received signals to all the other apparatuses in the network. Therefore, the arbitration process is necessary in order to prevent packet conflicts. As a result, at a specific time only one node can transmit a packet.

Figure 7B:
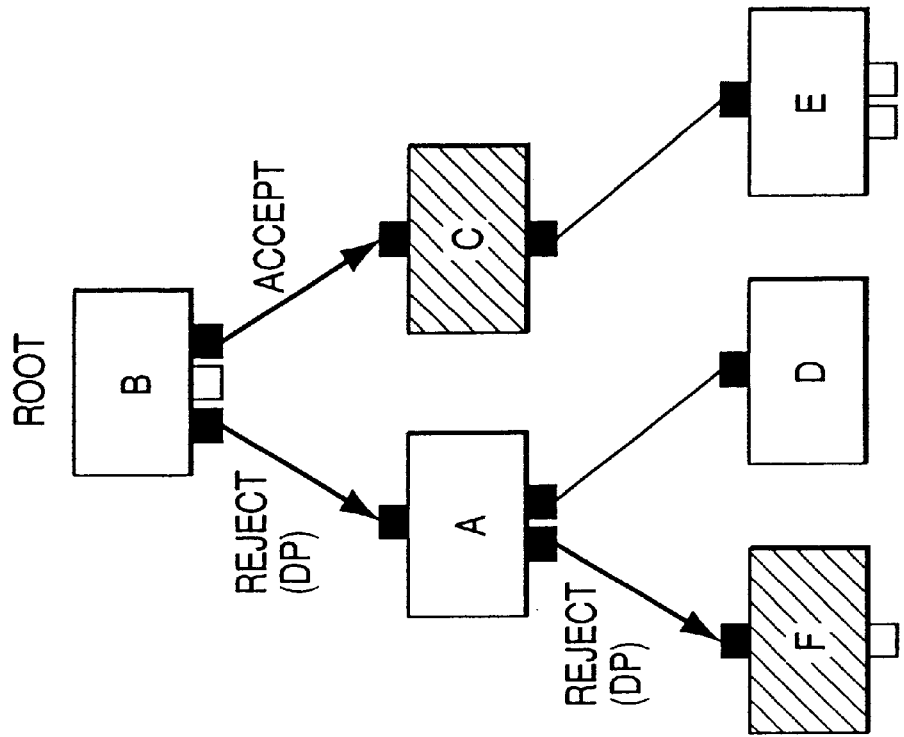
FIGS. 7A and 7B are diagrams for explaining arbitration.
Figure 7A:
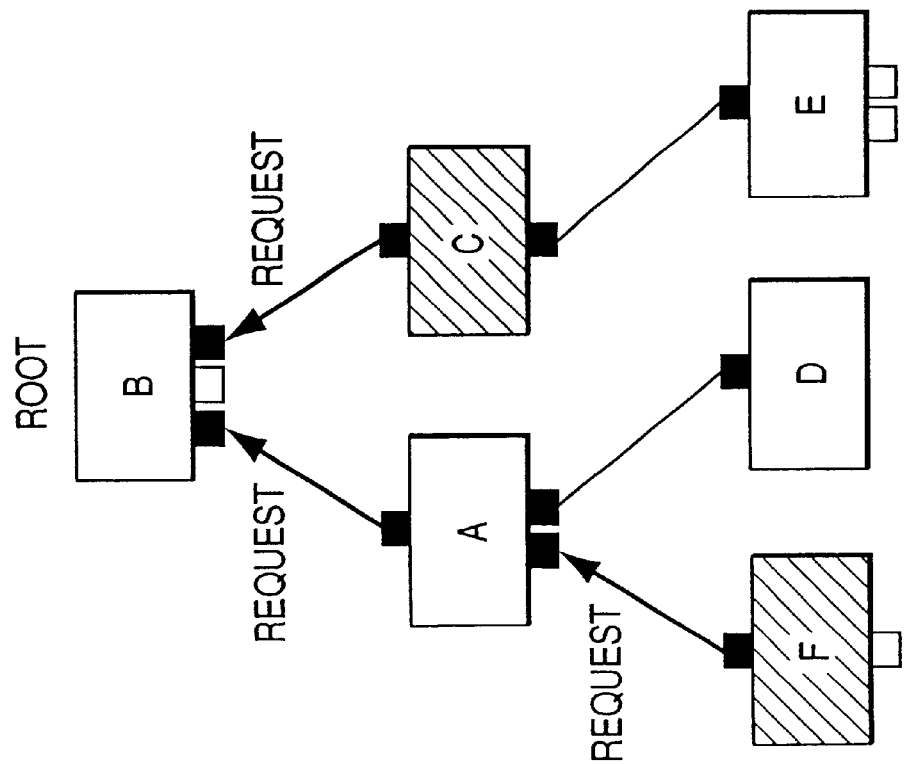

FIGS. 7A and 7B are diagrams for explaining the arbitration process. In FIG. 7A is shown the arbitration performed when the right of use of a bus is requested, and in FIG. 7B is shown the arbitration performed when the right of use of a bus is permitted.

When the arbitration is initiated, one or more nodes issue to their parents a request for the right of use of a bus. In FIG. 7A, node C and node F are the nodes that issue requests for the right of use of the bus. Upon receipt of the requests, the parent node (node A in FIG. 7) issues (relays) to its parent node (node B in FIG. 7) a request for the right of use of the bus. This request is finally transmitted to the root node that performs the arbitration.

Upon receiving the requests for the right to use the bus, the root node determines which nodes are to be permitted to use the bus. This arbitration is performed only by the root node, and the use of the bus is granted only to a node for which the right of use has been determined through arbitration. For example, in FIG. 7B, the request by node C is accepted, while the request by node F is denied.

The root node transmits a DP (Data Prefix) packet to a node that was not selected during the arbitration process, and notifies the node that the request was denied. The request for the right to use the bus, which was issued by the node whose request was denied, is suspended and held until the next arbitration process is performed.

The node that is granted permission to use the bus as the result of the arbitration can thereafter initiate the transmission of data.

An explanation will now be given for an asynchronous transmission.

Figure 8:
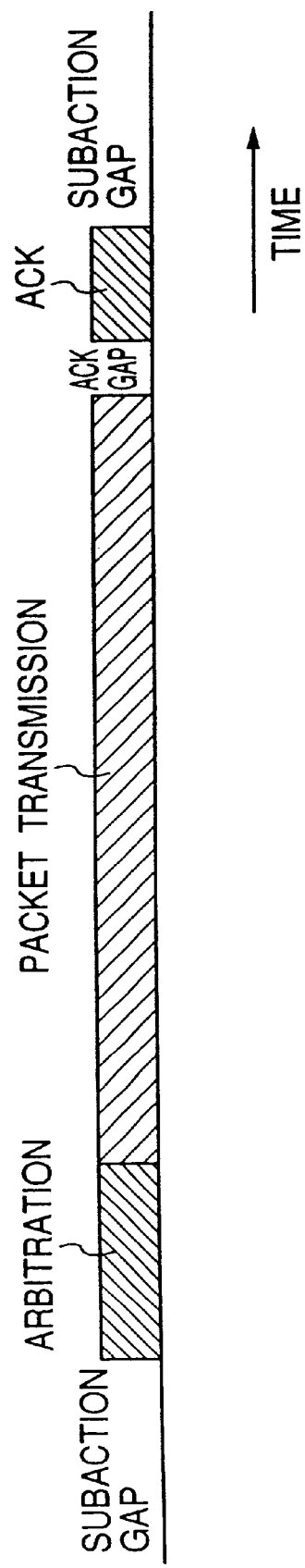
FIG. 8 is a diagram showing the time-transient shift state for asynchronous transmission.

FIG. 8 is a diagram showing the time-transient shift state that exists during an asynchronous transmission.

In FIG. 8, the first sub-action gap indicates that the bus has entered an idle state. When the idle time has become a constant, a node that desires to perform a transmission determines that the bus can be used, and initiates the arbitration required to obtain the right to use the bus.

When as a result of arbitration a node obtains the right to use a bus, that node transmits data in the form of packets. Whereafter, following the elapse of a short ACK period, a node that receives the data returns a code (ACK) to acknowledge receipt of the data or returns a response packet. In this manner, the transmission of data is completed.

The ACK code consists of a four-bit information nibble plus a four-bit checksum nibble, and includes information indicating whether the transmission of data has been successful, or whether the operating state is the busy state or the pending state. The ACK code is immediately returned to the transmission source node.

Figure 9:
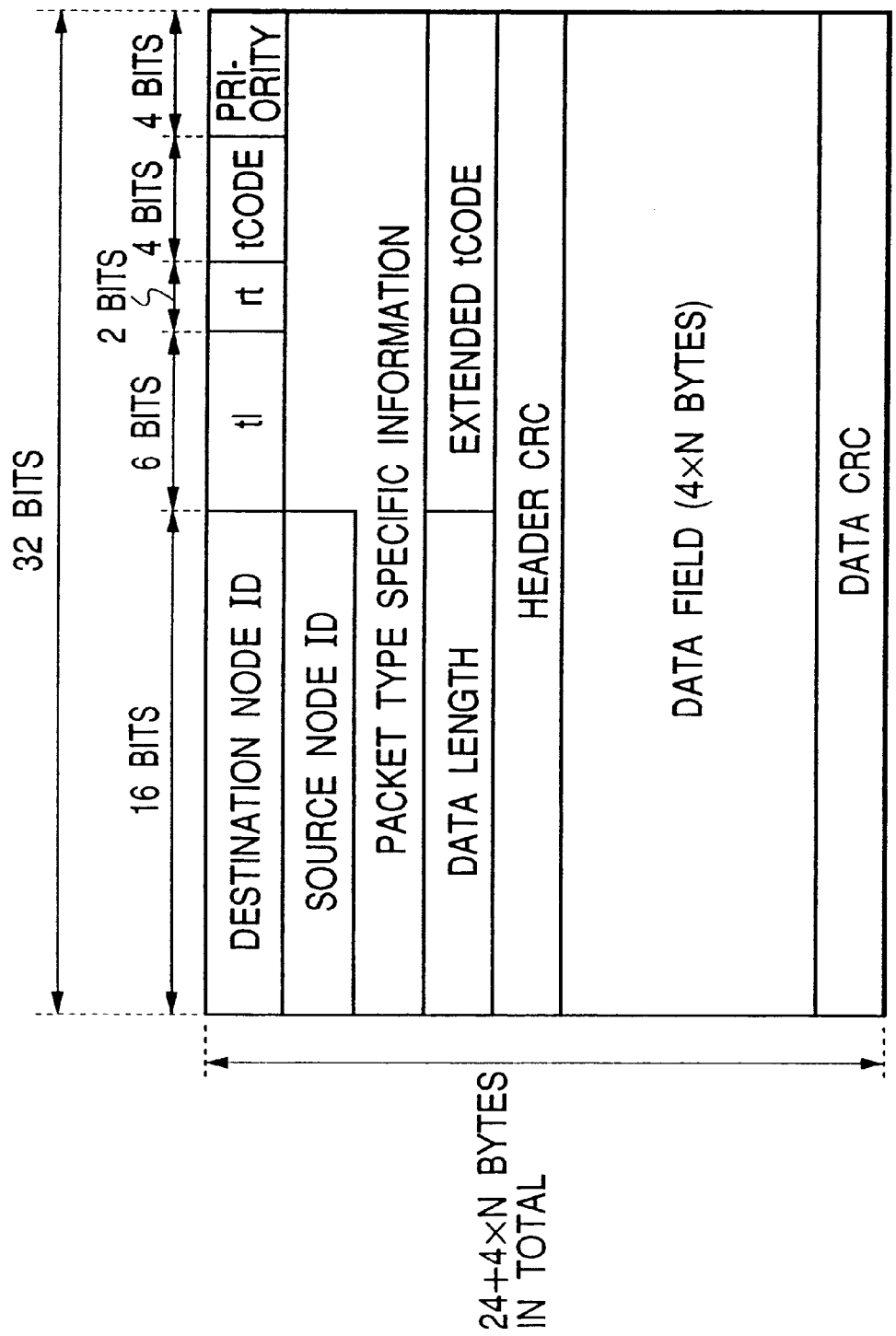
FIG. 9 is a diagram for explaining a packet format for asynchronous transmission.

FIG. 9 is an explanatory diagram showing an example packet format for asynchronous transmission.

The packet consists of a data portion, error correction CRC data, and a header portion. As is shown in FIG. 9, a destination node ID, a source node ID, the length of the data to be transmitted, and various other codes are written in the header portion.

An asynchronous transmission is a one-to-one communication between a specific node and another node. And a packet is broadcast by a transmission source node to the remaining nodes in the network. However, since each node ignores all packets other than those that are addressed to it, only the destination node reads the packet.

An explanation will now be given for the isochronous transmission process.

The isochronous transmission process, which is the most important feature of the 1394 serial bus, is a transmission mode that is appropriate for the transmission of data such as multimedia data, to include video data and audio data, for which real-time transmission is required.

While the asynchronous transmission is a one-tone transmission, the isochronous transmission is a broadcasting transmission mode during which a transmission source node uniformly transmits data to all other nodes.

Figure 10:
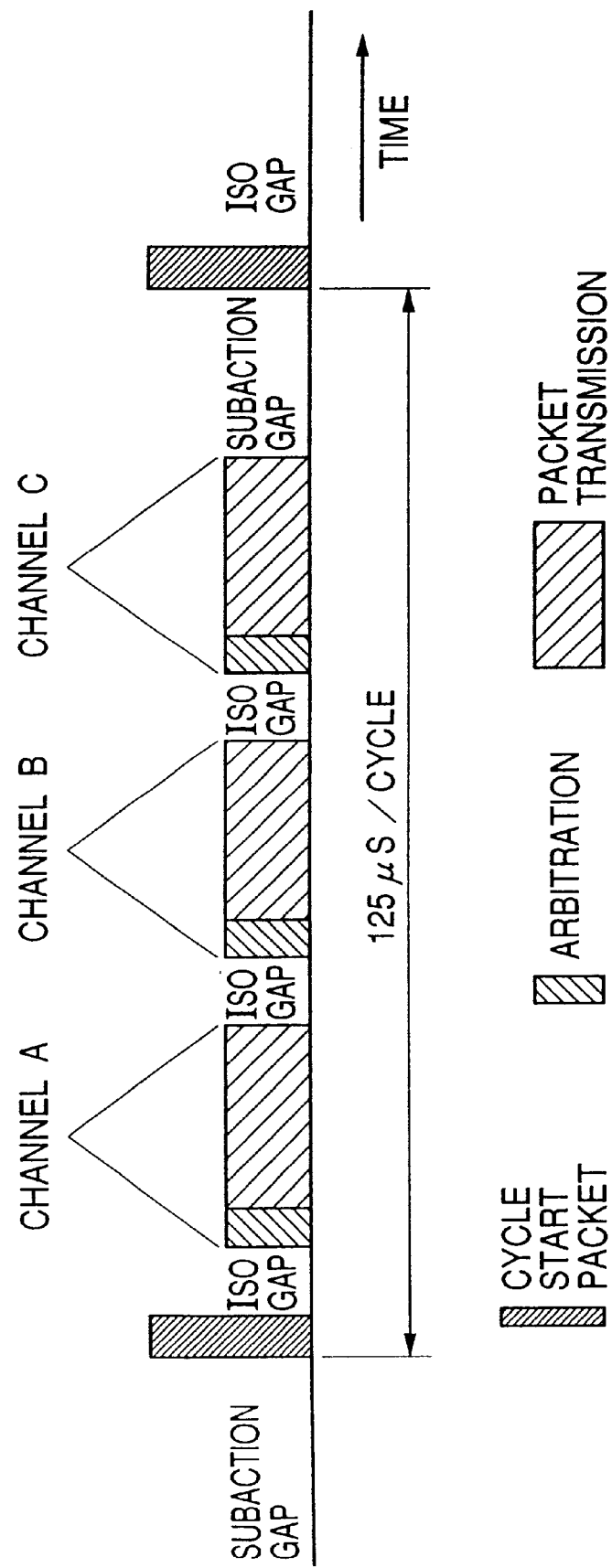
FIG. 10 is a diagram showing the time-transient shift state for isochronous transmission.

FIG. 10 is a diagram showing a time-transient shift state for an isochronous transmission.

Isochronous transmissions are performed along the bus at constant intervals. One of these intervals is called an isochronous cycle, which is 125 micro-seconds in length. Included in a cycle start packet is the start time for the cycle, which is used to adjust the timing for an individual node. A node called a cycle master transmits a cycle start packet that indicates the start of a current cycle that occurs after the transmission of data at the preceding cycle is completed and after a predetermined idle time (a subaction gap) has elapsed. In other words, the time interval at which cycle start packets are transmitted is 125 micro seconds.

Since channel IDs, such as channel A, channel B and channel C shown in FIG. 10, are provided for a plurality of packets during one cycle, the packets can be identified as they are being transmitted. Therefore, packets can be transmitted among a plurality of nodes in real time, and a destination node can fetch only data having a desired channel ID. The channel ID does not represent the address of a transmission destination, and merely provides a logical number for the data. Therefore, a specific packet can be broadcast by one transmission source node to all the other nodes.

The arbitration process is performed before the isochronous transmission of packets is begun, as well as before the asynchronous transmission is begun. However, since unlike the asynchronous transmission the isochronous transmission is not a one-to-one communication, no ACK exists.

An isochronous gap (Iso Gap) in FIG. 10 represents the idle time that is required to ascertain, before an isochronous transmission, that a bus is not in use. When a predetermined idle time has elapsed, the node that is to perform an isochronous transmission determines whether the bus is in use, and performs an arbitration process before beginning the transmission.

Figure 11:
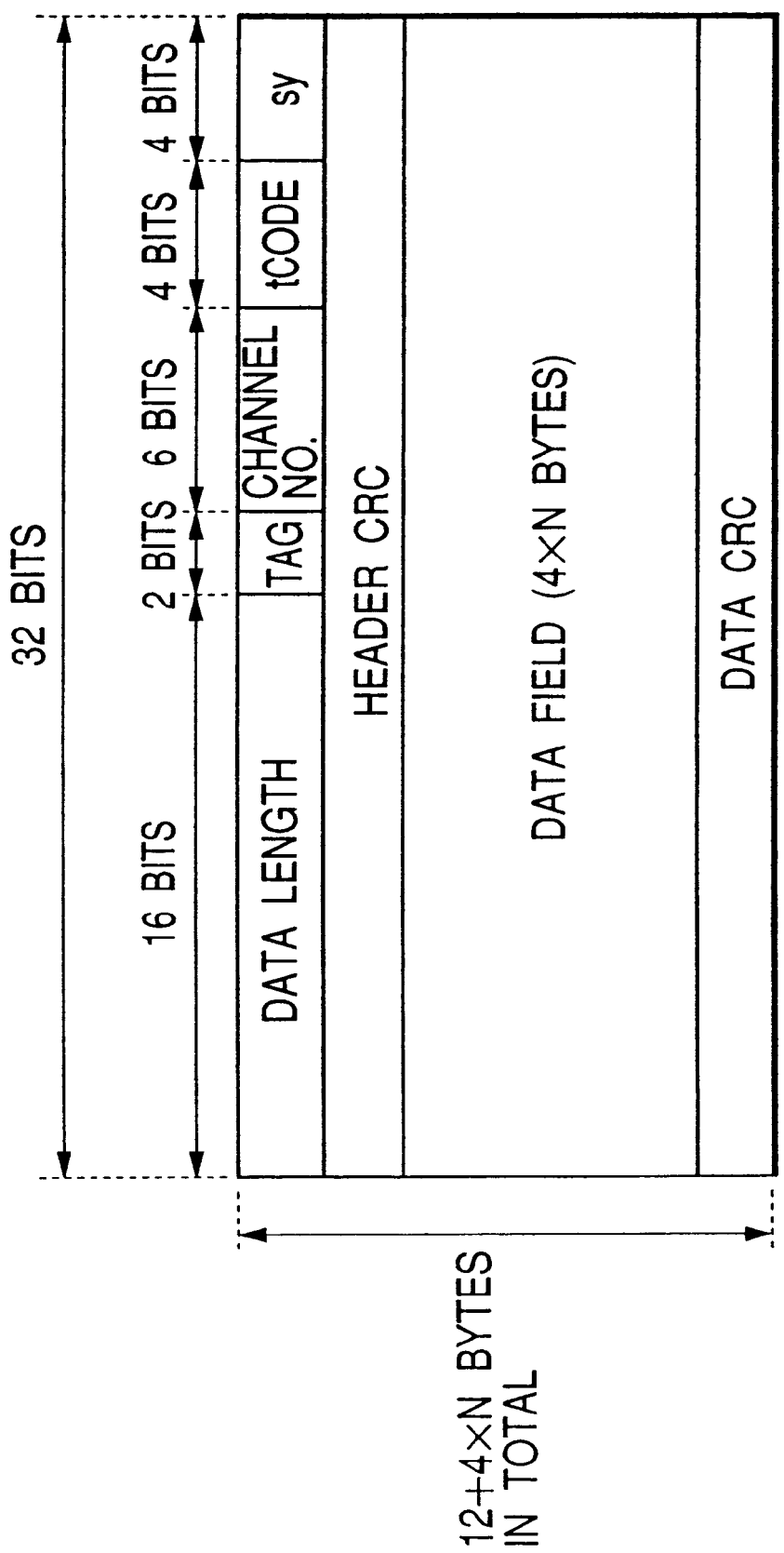
FIG. 11 is a diagram for explaining a packet format for isochronous transmission.

FIG. 11 is a diagram for explaining an example packet format for an isochronous transmission.

Each of the packets selected for the channels consists of a data portion, an error correction data CRC, and a header portion. As is shown in FIG. 11, the length of data to be transmitted, a channel ID, various codes, and an error correction CRC header are written in the header portion.

The bus cycle will now be described.

Figure 12:
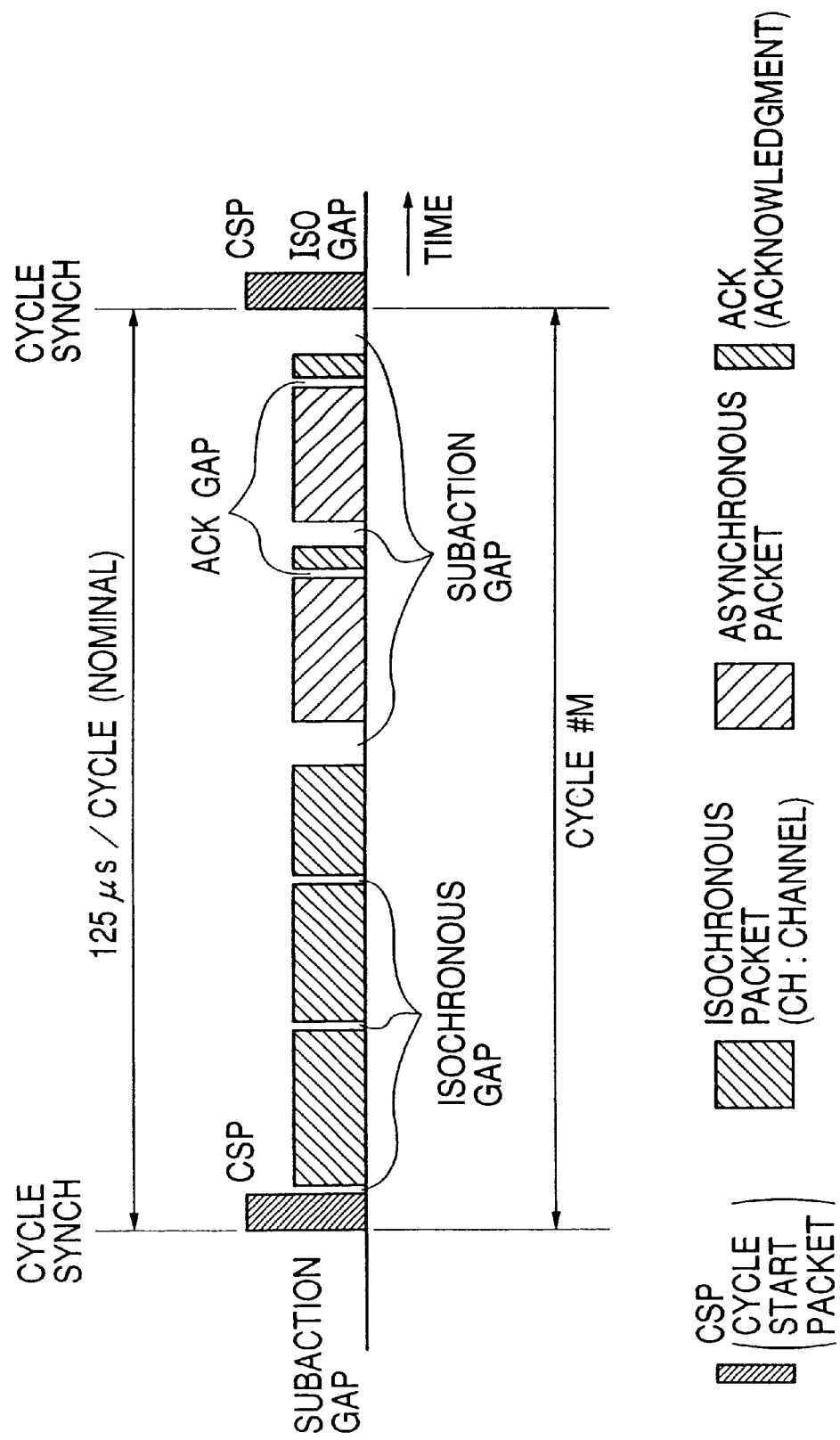
FIG. 12 is a diagram showing the time-transient transmission state into which the bus enters placed when both an isochronous transmission and an asynchronous transmission are present.

Actually, an isochronous transmission and an asynchronous transmission can coexist on the 1394 serial bus during a transmission. FIG. 12 is a diagram showing the time-transient shift state for the bus when the isochronous transmission and the asynchronous transmission coexist.

The isochronous transmission is performed before the asynchronous transmission. This is done because, for the transmission following the start of the cycle start packet, the gap length (isochronous gap) required to initiate the isochronous transmission is shorter than is the gap length (subaction gap) for the idle time that is required to initiate the asynchronous transmission. Therefore, the isochronous transmission is performed before the asynchronous transmission.

During the m-th cycle (cycle #m), as is shown in FIG. 12, the cycle start packet is transmitted by the cycle master to the individual nodes. The nodes then adjust the time, and when a predetermined idle time (isochronous gap) has elapsed, a node that should perform an isochronous transmission performs the arbitration and initiates the transmission of packets. In FIG. 12, isochronous packets for channels e, s and k are transmitted sequentially.

When the processing extending from the time the arbitration is performed until the packets are transmitted has been repeated a number of times that is equivalent to the number of channels, and the isochronous transmission performed for the m-th cycle (cycle #m) has been completed, the asynchronous transmission can be begun. When the idle time has reached the subaction gap at which the asynchronous transmission is enabled, the node that is to perform the asynchronous transmission determines that it can start the arbitration.

It should be noted, however, that the period during which the asynchronous transmission is enabled is limited only to a period beginning upon the termination of the isochronous transmission and continuing until the next cycle start packet (Cycle Synch) is transmitted, a time during which the subaction gap for the initiation of the asynchronous transmission is obtained.

At the m-th cycle (cycle #m) in FIG. 12, first, the isochronous packets for three channels are transmitted, and then two asynchronous packets (packet 1 and packet 2) (including ACKs) are transmitted.

Since following the asynchronous packet 2 the time (Cycle Synch) is reached at which the (m+l)th cycle (cycle #m+1) should be started, the transmission at the m-th cycle (cycle #m) is terminated.

If the time (Cycle Synch) at which the next cycle start packet should be transmitted is reached during an asynchronous or an isochronous transmission, the operation is not forcibly halted and end of the idle time following the pertinent transmission is waited for before the transmission of the next cycle start packet is begun. That is, when one cycle is continued for 125 micro seconds or longer, the next cycle is shorter than the standard 125 micro seconds by a time that is equivalent to that of the delay. In other words, the isochronous cycle can be extended or shortened while using 125 micro seconds as a reference time.

It should be noted, however, that as necessary the isochronous transmission is performed continuously during each cycle in order to provide a real-time transmission, and that the asynchronous transmission may be delayed until the following cycle due to a reduction in the cycle time.

Such delay information is also managed by the cycle master.

Figure 13:
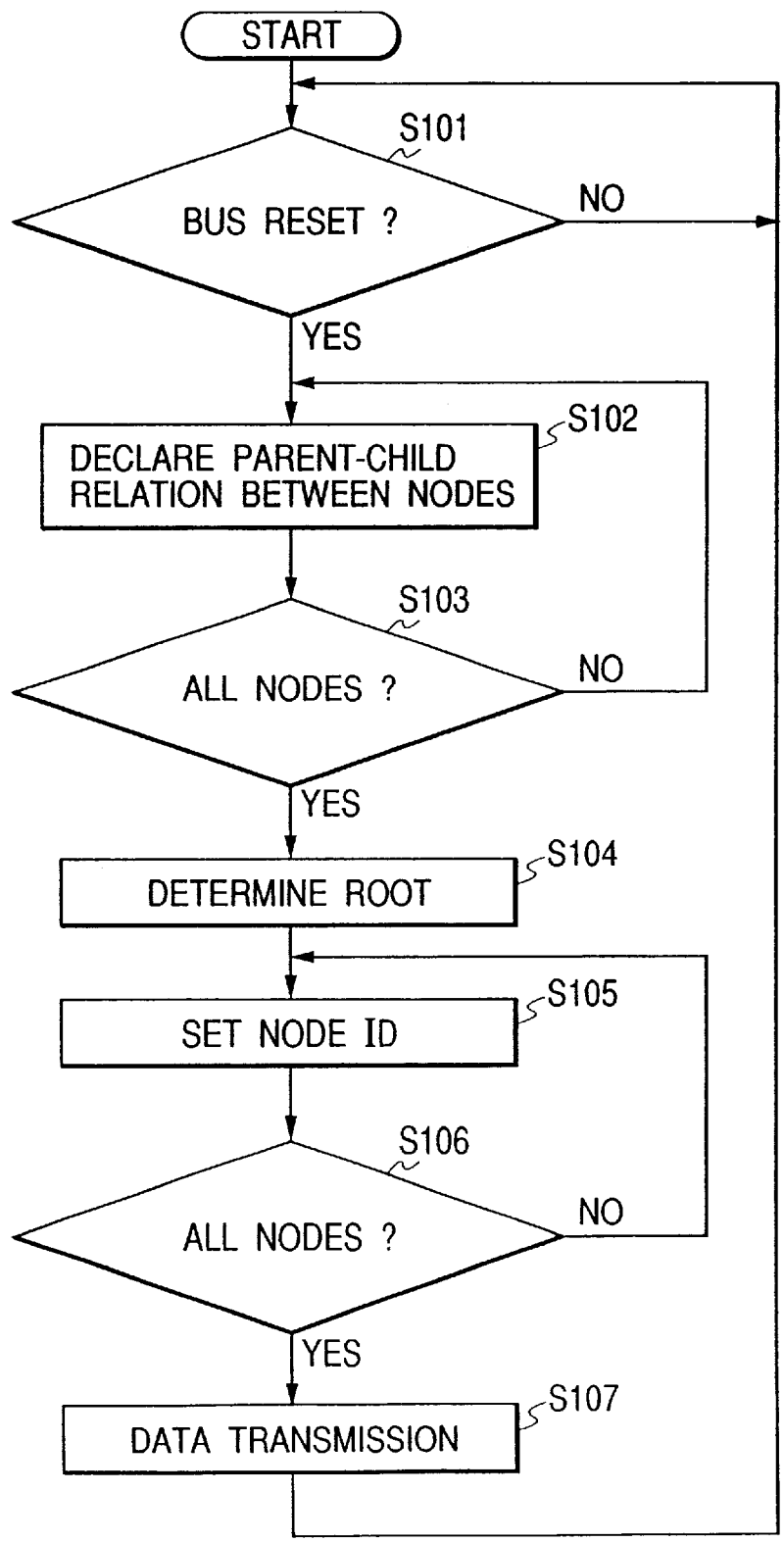
FIG. 13 is a flowchart showing the bus operation sequence extending from the time the bus is reset until the node ID has been determined that enables data transmission.

The above described node ID determination processing will now be described. After the bus is reset, the operation for providing node ID numbers for the individual nodes is begun so that the nodes can construct a new network configuration. FIG. 13 is a flowchart for a bus processing series extending from the time the bus is reset until the node ID number is determined and data transmission is initiated.

The resetting of the bus in the network is monitored constantly, and whether or not bus reset has occurred is determined in accordance with the ON/OFF state of the power of the node (step S101). This determination process is repeated until the bus reset occurs. When at step S101 the bus reset has occurred, the parent-child relationship is declared for the nodes connected directly in order to obtain a new connection state for the network that has now been reset (step S102). A check is then performed to determine whether the parent-child relationship has been declared for all the nodes (step S103), and when the parent-child relationship has not been declared for all the nodes, the processes at steps S102 and S103 are repeated.

When, at step S103, the parent-child relationship has been declared for all the nodes, one root is determined (step S104). Then, the setup is performed to provide node ID numbers for the individual nodes (step S105).

A check is performed to determine whether the node ID numbers have been set for all the nodes (step S106).

When all the node ID numbers have not been set for all the nodes, the process at step S105 is repeated until node ID numbers are provided for all the nodes in the above described node order. When, at step S106, all the node ID numbers have been set for all the nodes, it is assumed that a new network configuration has been identified by all the nodes. Thus, the exchange of data among the nodes is enabled (step S107), and the transmission of data is initiated.

In the state at step S107, the mode for monitoring the occurrence of a bus reset is again entered, and when a reset of the bus has occurred, the processing beginning at step S101 is repeated.

Figure 14:
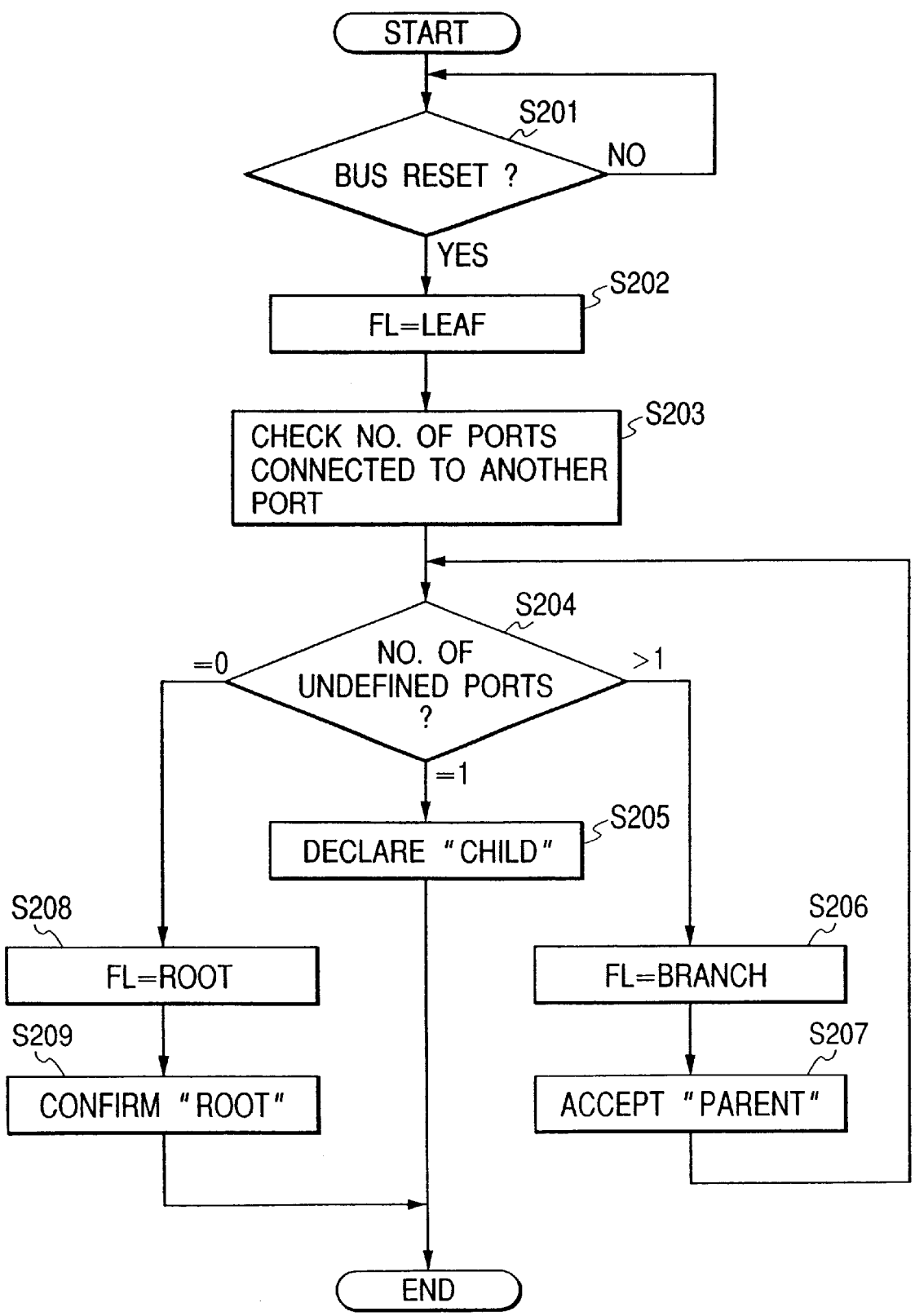
FIG. 14 is a detailed flowchart showing the processing performed in FIG. 13 extending from the time the reset of the bus is detected (step S101) until the determination of the root has been completed (step S104)

FIG. 14 is a detailed flowchart showing the processing in FIG. 13 extending from the time the bus reset is detected (step S101) until the root is determined (step S104).

First, a check is performed to determine whether a bus reset has occurred (step S201). When a bus reset has not occurred, the operating state is set to the standby state until a bus reset does occur. But when, at step S201, it is found that a bus reset has occurred, the network configuration is temporarily reset.

Then, a flag indicating a leaf (node) is set for each of the apparatuses as the first stage of a job for again obtaining the connection state for the network that has been reset (step S202). Following this, all of the ports of the apparatuses are examined to determine how many of the ports are connected to other nodes (step S203).

The number of undefined ports (those for which the parent-child relationship has not yet been determined) is examined in order to begin to declare the parent-child relationship (step S204). It should be noted that immediately after the bus is reset the number of ports and the number of undefined ports correspond, and that as parent-child relationships are determined, the number of the undefined ports detected at step S204 is accordingly reduced.

Immediately after the bus is reset, only a leaf can declare a parent-child relationship, and whether a pertinent node is a leaf can be determined in accordance with the number of ports found at step S203. That is, if the pertinent node is a leaf, the initial number of undefined ports it has is "1". Therefore, at step S205, the node makes a parent-child relationship declaration, relative to a connected node, to the effect that, "I am a child and my connected node is a parent". The operation is thereafter terminated.

When, at step S203, the number of ports at a specific node is determined to be greater than one the node realizes that it is a branch. And when at step S204, immediately after the bus is reset, the number of undefined ports at the node is determined to be greater than one, a flag FL is set that indicates the node is a branch (step S206). Then, as a branch, the node accepts the parent-child relationship of "parent-"declared by the leaf that is connected to it (step S207).

After the leaf has declared the parent-child relationship and at step S207 the branch has accepted it, at step S204 the number of undefined ports at the branch is determined, and when the number of undefined ports is "1", the branch can issue a declaration to the effect that it is a child of a node that is connected to its remaining port.

If, at step S204 during the second cycle, the number of undefined ports at the specific branch is two or more, at step S207 the branch accepts the designation of "parent" issued by the leaf or by another branch at the time it confirms the relationship.

Finally, when at one of the branches the number of undefined ports is 0, or, exceptionally, at a leaf (because even though it was possible the node did not quickly declare itself to be a child), it is assumed that the declaration of the parent-child relationships for the entire network has been completed. Then, a root flag is set only for that node that has no undefined ports (a node for which all the ports have been determined to be parent ports) (step S208), and the root is confirmed (step S209).

Figure 15:
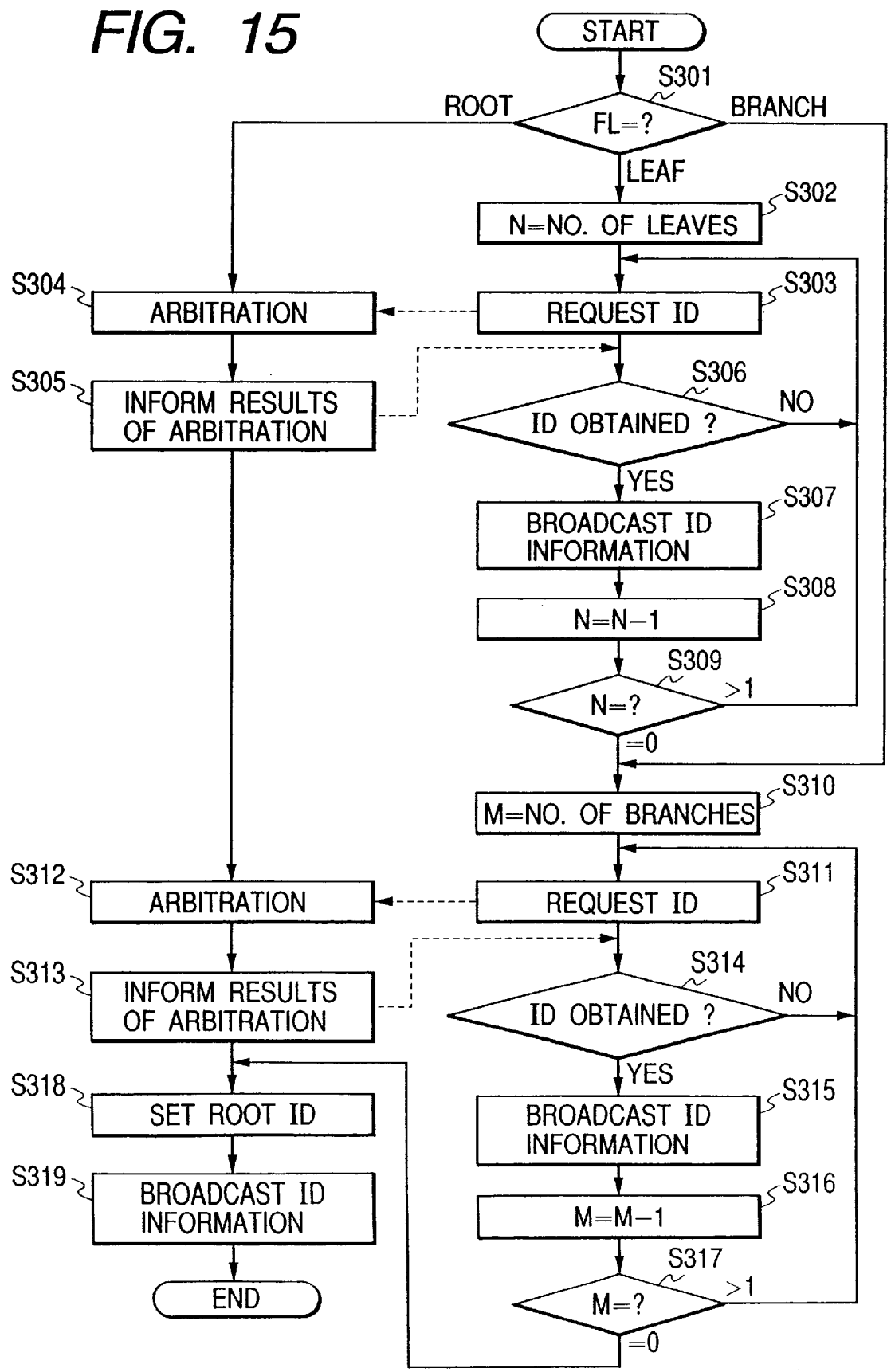
FIG. 15 is a detailed flowchart showing the processing in FIG. 13 extending from the time the determination of the root is made (step S104) until the determination of the node ID has been made (step S106)

FIG. 15 is a detailed flowchart showing the processing in FIG. 13 extending from the determination of the root (step S104) to the determination of the node ID number (step S106).

Since the flag information for the leaves, the branches and the root node is set during the processing in FIG. 14, the nodes are sorted in accordance with the flags (step S301).

The setup for the node ID numbers is begun with the leaves, ID numbers being provided, in the named order, for the leaves, the branches and the root, beginning with the node that has the smallest node number (node number=0 . . . ).

When the node type is a leaf, the number of leaves that are present in the network is set to N (N is a natural number) (step S302). Then, requests that node ID numbers be provided are issued by the individual leaves to the root (step S303).

When a plurality of such requests are issued, the root performs an arbitration process (step S304). Thereafter, a node ID number is provided for the one node that is accepted as a result of arbitration, and notifications that their requests were denied are transmitted to the remaining nodes (step S305).

After issuing a request for a node ID number, a leaf determines whether the node ID number has been obtained (step S306). Then, at step S303 a node that has failed to acquire a node ID number again issues an ID number request, while the leaf that has obtained a node ID number broadcasts its ID information to all the other nodes (step S307). When the ID information for a specific node has been broadcast, the number of leaves N is decremented by one (step S308).

Then, the remaining leaf number N is examined (step S309). And when the remaining number of leaves N is equal to or greater than one, the processing from step S303, whereat a node ID number is requested, to step S309 is repeated.

When the ID information for all the leaves has been broadcast, at step S309 it is determined that the number N=0 and the ID setup for the branches is initiated.

First, the number of branches M (M is a natural number) that are present in the network is set (step S310).

The branches then issue requests to the root to obtain node ID numbers. The root performs an arbitration process and provides the branch whose request is accepted the node ID number that immediately follows the node ID number assigned to the last leaf (step S312). Thereafter, ID information, or signals indicating their requests were not accepted are transmitted to the other branches that issued requests (step S313).

The branches that requested node ID numbers at step S311 then make an examination to determine whether they have obtained node ID numbers (step S314), and the branches that failed to acquire node ID numbers again issue requests for node ID numbers to the root at step S311.

When, at step S314, a specific branch obtains a node ID number, the branch broadcasts its ID information to all the other nodes (step S315). When the ID information for a specific node has been broadcast, the number of remaining branches M is decremented by one (step S316).

When the number of the remaining branches M is equal to or greater than one, the processing at steps S311 to S316 is repeated until all the branches have broadcast their ID information. When all the branches have obtained their ID information, at step S317 M=0 and the acquisition of node ID numbers for the branches is terminated. As a result, only the root has not as yet acquired a node ID number. Therefore, the root employs as its ID number the smallest node ID number that has not yet been assigned (step S318), and broadcasts this ID information (step S319).

By means of the above processing, after the parent-child relationships have been determined the node ID numbers are set for all the nodes.

Figure 16:
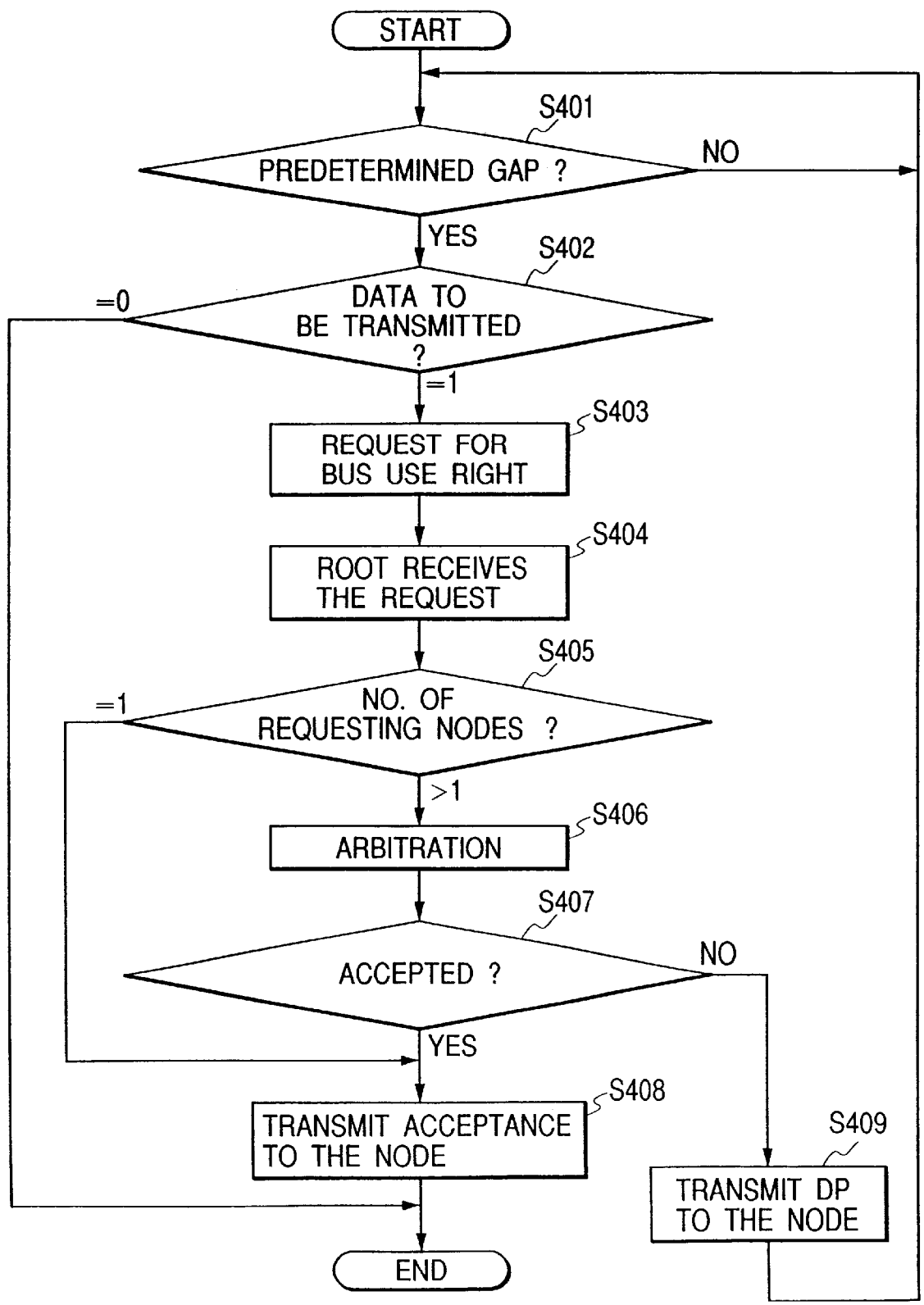
FIG. 16 is a flowchart showing the arbitration processing.

FIG. 16 is a flowchart showing the arbitration processing.

The bus must be in the idle state when a node initiates the transmission of data. When a predetermined idle time gap interval (e.g., a subaction gap) that is set for each transmission mode has elapsed, the node can ascertain that the preceding data transmission has been terminated and that the bus is currently not in use, and that it can begun to transmit data.

First, a check is performed to determine whether a predetermined gap interval has elapsed that corresponds to data that are to be transmitted, such as asynchronous data or isochronous data (step S401). As long as the predetermined gap internal is not obtained, the right of use of the bus, which is required before transmission can begin, can not be requested. Therefore, the process at step S401 is repeated until the predetermined gap interval is obtained.

When, at step S401, the predetermined gap interval is obtained, a check is performed to determine whether there are data to be transmitted (step S402). When there are no such data, the processing is terminated.

When data to be transmitted are present, a request for the right of use of the bus is issued to the root (step S403). A signal that represents the request for the right of use of the bus is relayed via the apparatuses in the network in FIG. 7 until it finally arrives at the root.

When the root receives one or more requests for the right of use of the bus (step S404), the root makes an examination to determine how many nodes issued requests (step S405). When, at step S405, it is found that a plurality of nodes issued requests, the root performs an arbitration process to determine which node should be provided the right of use (step S406). This arbitration is performed fairly; the same node is not granted permission all the time, and the right of use is awarded to all the nodes equally (fair arbitration).

Through the arbitration, the root sorts out the node that can receive the right of use and the other nodes that whose requests are denied (step S407). Since the result of the decision at step S407 for the node that obtains the right of use is affirmative (YES), a permission signal for the initiation of the transmission of data (packets) is transmitted by the root to the pertinent node (step S408). Since the result of the decision at step S407 for the nodes that can not obtain the right of use is negative (NO), a signal DP that indicates their requests were denied is transmitted to these nodes by the root (step S409).

When at step S405 the number of nodes is one, the right of use of the bus is given to that node, and the process at step S408 is performed. The processing is thereafter terminated.

An explanation will now be given, while referring to FIGS. 17 and 18, for the fair arbitration performed at steps S406 and S407 in FIG. 16.

Figure 17:
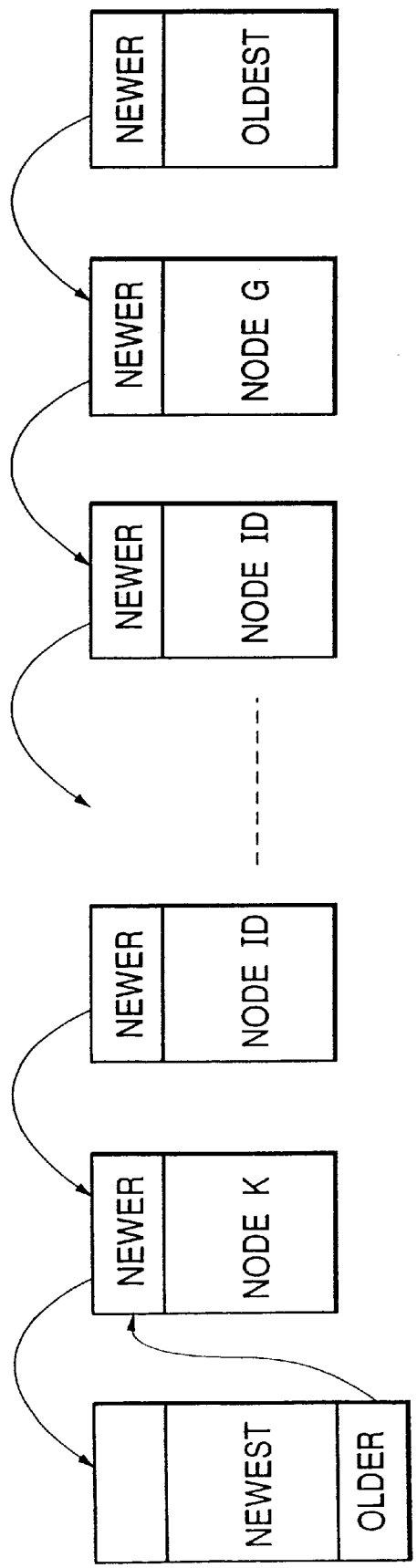
FIG. 17 is a link table showing, as a time series, nodes that obtain the right of use of the bus.
Figure 18:
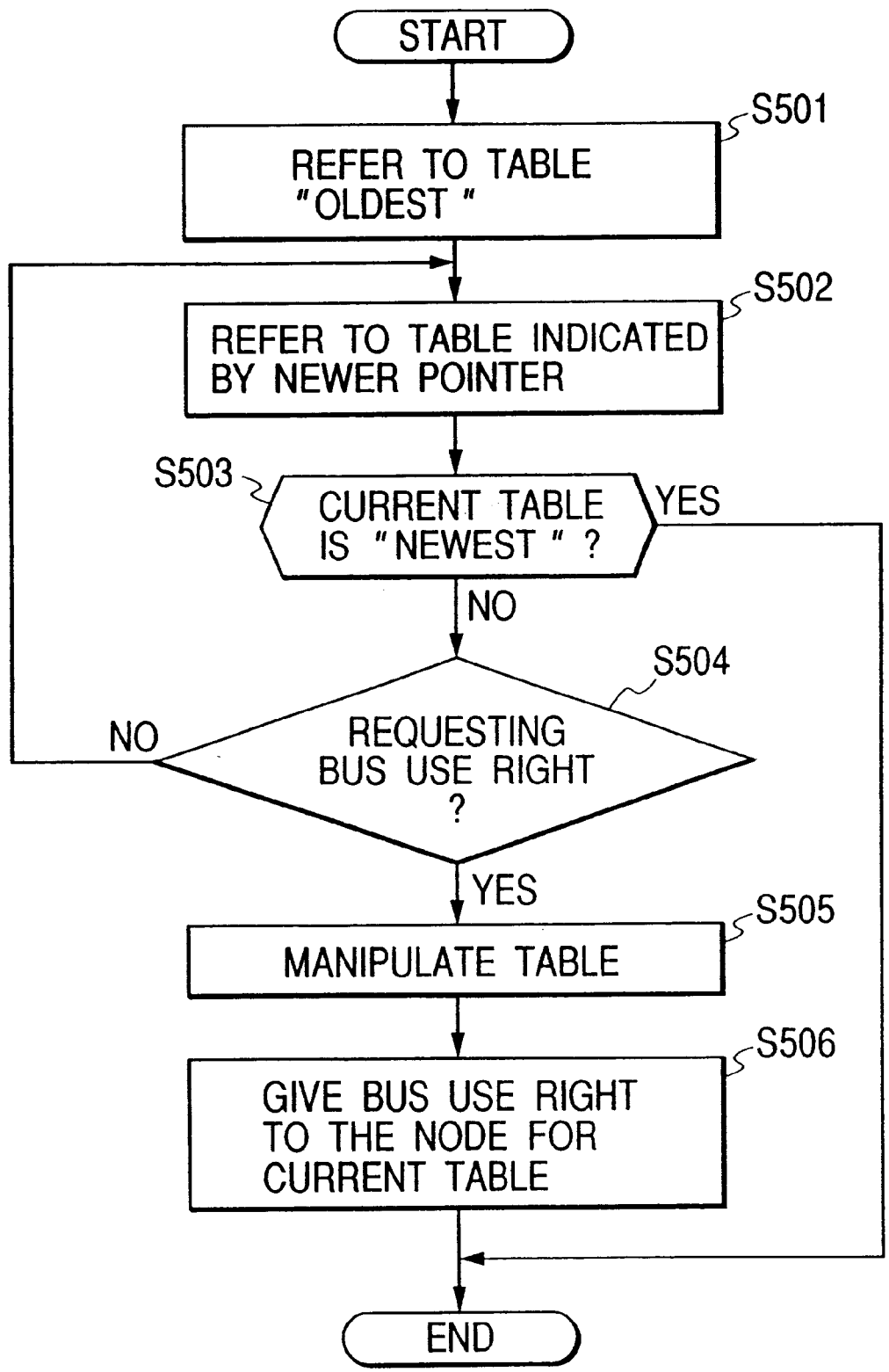
FIG. 18 is a flowchart showing the fair arbitration processing.

FIG. 17 is a link table showing, as a time series, the nodes that obtain the right of use of bus, and FIG. 18 is a flowchart showing the determination processing performed for fair arbitration.

Since as a result of fair arbitration the right (permission) of use of the bus is provided for the first node that is selected to use the bus, the bus acquisition nodes are arranged in order beginning with the oldest, as is shown in FIG. 17.

An "Oldest" table is referred to in which is stored information concerning the first node that obtained the right of use of the bus (step S501). A table pointed at by a Newer pointer is searched for to determine whether there is a node that has not yet been granted the right of use of the bus (step S502). If such a node is found in the network (assume here that this node is node G), a check is performed to determine whether the table that is currently referred to is a Newest table in which is stored information concerning the latest node that obtained the right of use of the bus (step S503). When the current table is the Newest table, arbitration need not be performed, and the processing is thereafter terminated.

When the result of the decision at step S503 is negative (NO), a check is performed to determine whether node G issued the request for the right of use of the bus (step S504). When node G issued the request, the table is manipulated to provide the right (permission) of use of the bus to node G (step S505). That is, the contents of the Newer pointer in the node G that points to its ID information that is stored are copied to the Newer pointer for the Oldest area. Further, the address of the node G is copied to the Newer pointer in the table that is pointed at by the Older pointer in the Newest area in which is stored information concerning the latest node that obtained the right of use of the bus. The address of the node G is also copied to the Older pointer in the Newest area. In addition, the address in the Newest area is copied to the Newer pointer in the node G. As a result, node G, which obtains the right of use of the bus, is treated as the latest node in the link table to obtain the right (permission) of use of the bus. After the manipulation of the table, the right of use of the bus is provided for a node that corresponds to the table that is currently referred to (step S506). The processing is thereafter terminated.

Even when node G is regarded as one of the nodes in the network that has not yet obtained the right of use of the bus, so long as node G does not request the right of use of the bus (the decision at step S504 is negative (NO)), the table pointed at by the Newer pointer in node G is examined at steps S502 to S504.

An explanation will now be given for a copier system that serves as an image processing system that employs the thus featured 1394 serial bus.

Figure 19:
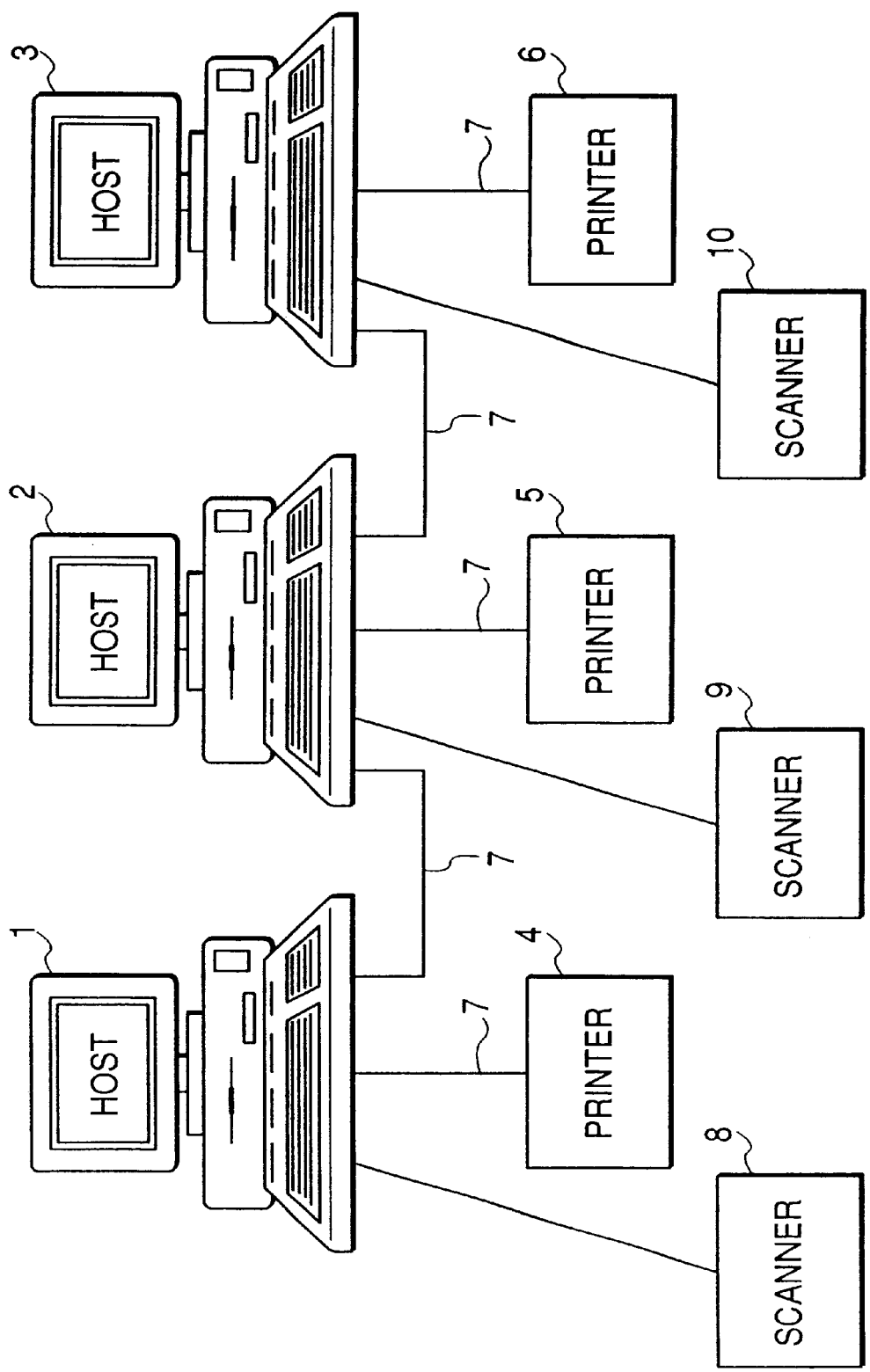
FIG. 19 is a block diagram illustrating the arrangement of printing systems as image processing apparatuses according to the embodiment of the present invention.

FIG. 19 is a block diagram illustrating the arrangement of a copier system that serves as an image processing system according to this embodiment. In FIG. 19, the copier system comprises three personal computers (hereinafter referred to as "hosts") 1 to 3 that serve as host computers, and printers 4 to 6 that are connected to the hosts 1 to 3. The hosts 1 to 3, the printers 4 to 6, and scanners 8 to 10 are interconnected by a 1394 serial bus 7, which is a high-speed serial bus.

Figure 20:
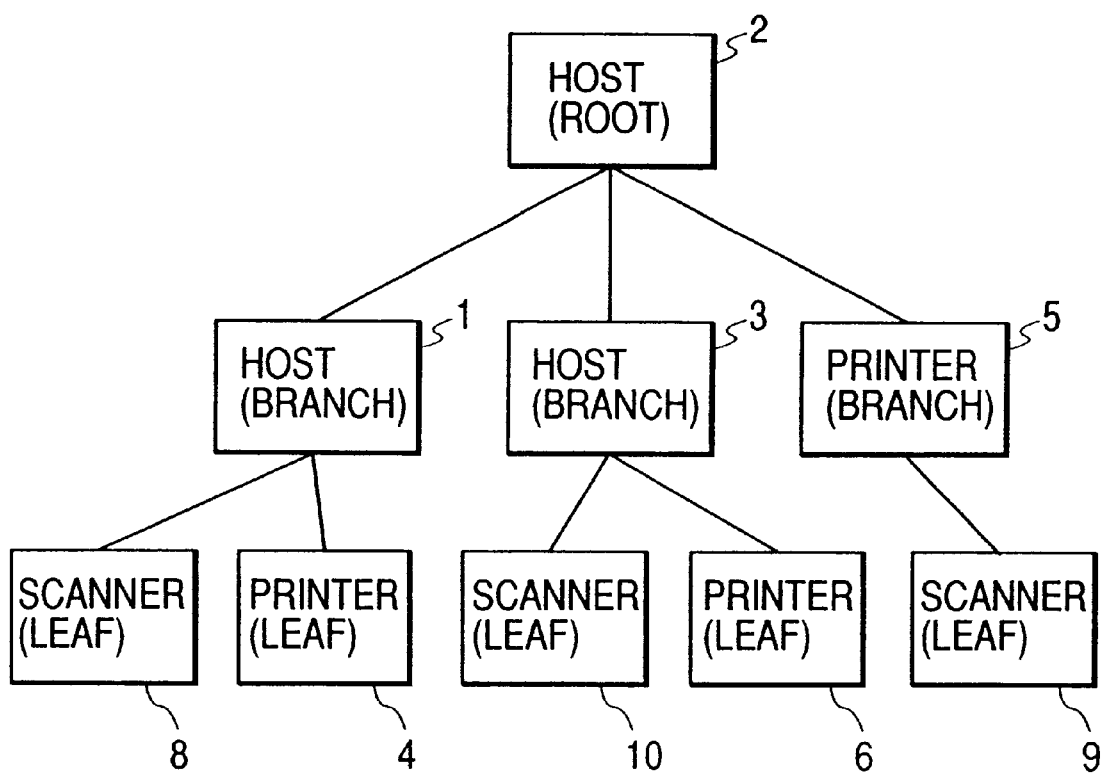
FIG. 20 is a diagram showing a network composed of components of the printing systems that are described in FIG. 19 as image processing apparatuses.

FIG. 20 is a diagram showing a network that is constituted by the components of the copier system in FIG. 19 that serves as an image processing system. As is apparent from FIG. 20, in the following description the host 2 serves as the root, the hosts 1 and 3 and the printer 5 serve as branches, and the printers 4 and 6 and the scanners 8 to 10 serve as leaves.

In this embodiment, an isochronous packet for which one or more channels (channels e, s and k) are assigned is used for the transmission of image data by the individual components (modules), while an asynchronous packet is used for the communication of a command or a status to the modules. FIG. 21 is a specific diagram for explaining a bus cycle for the transmission of image data.

Assume that the following three jobs are pending in the system shown in FIG. 18.

Job A: The host 1 transmits image data to the printer 4.
Job B: The host 2 transmits image data to the printer 5.
Job C: The host 3 transmits image data to the printer 6.

Figure 22A:
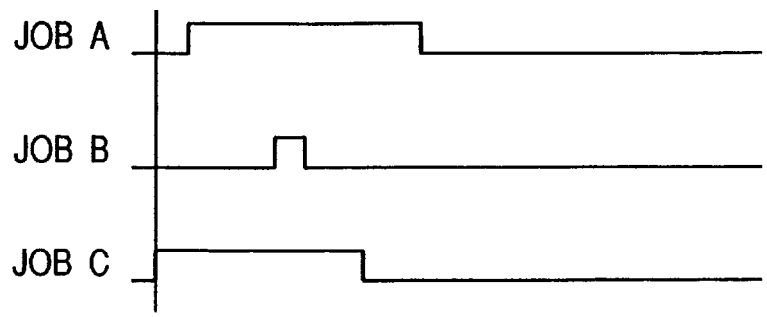
FIGS. 22A, 22B and 22C are timing charts showing the timings for the processing of three jobs, A to C.
Figure 22B:
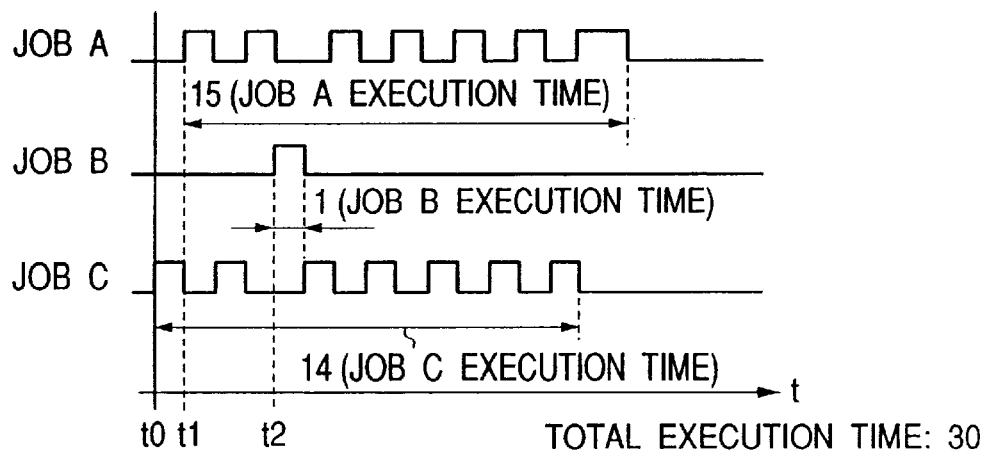
Figure 22C:
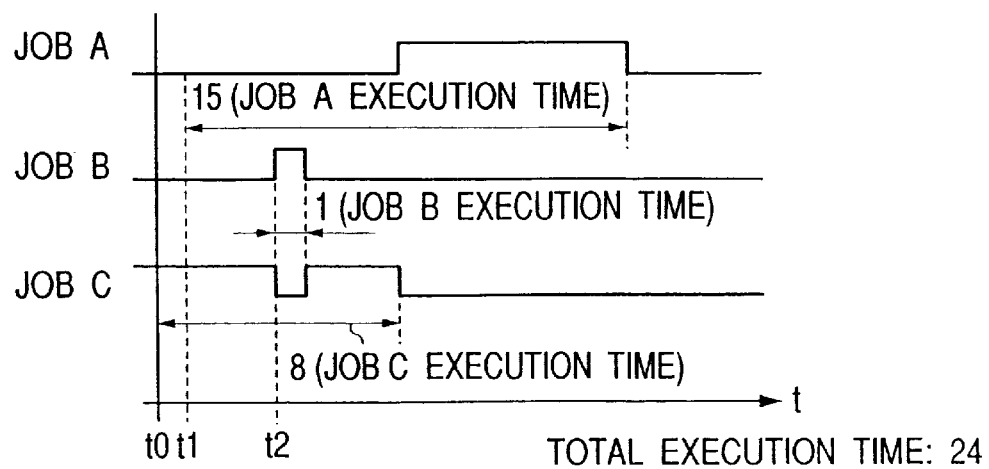

The three jobs A to C are processed at the timings shown in FIGS. 22A to 22C, which are timing charts representing the processing timings for the three jobs A to C.

In FIGS. 22A to 22C, assume that job C occurs at time to, job A occurs at time t1 and job B occurs at time t2. When it is premised that the right of use of the bus is constantly provided the individual modules, the three jobs A to C are processed at the timings shown in FIG. 22A.

However, when fair arbitration is performed, the simultaneous acquisition of the right of use of the bus every cycle is not guaranteed. Suppose that only one job can obtain the right of use of the bus. When a conflict arises because there is a plurality of jobs and the bus resources that are available are in short supply, the system that performs fair arbitration can not control the jobs so that all the jobs can obtain the right of use of the bus every cycle. In FIG. 22B are shown the timings for processing the jobs A to C when fair arbitration is adopted. As is apparent from the chart, the total execution time from the time the jobs are started until the time they are terminated is 30.

A system that does not perform fair arbitration (performs unfair arbitration) can reduce the overall waiting time, when compared with a system that performs fair arbitration. In this embodiment, therefore, unfair arbitration is employed instead of the ordinary fair arbitration.

Figure 23:
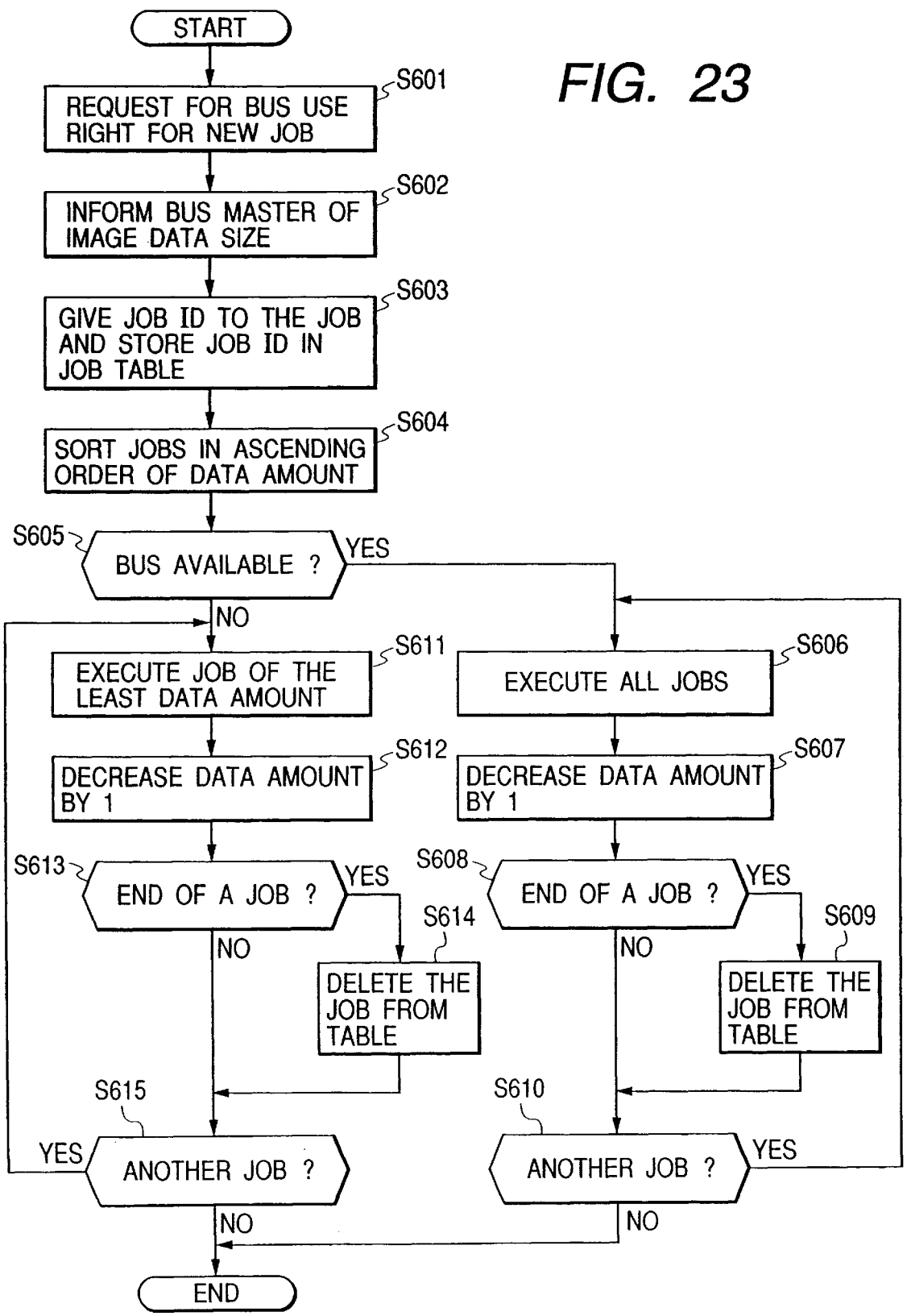
FIG. 23 is a flowchart showing the unfair arbitration processing.

FIG. 23 is a flowchart showing unfair arbitration. The program for implementing this processing is performed by the host 2, which is the root node. That is, the host 2 serves as identification means, preference determination means, and change means.

When a request for the right of use of the bus is detected for a job that includes the transmission of image data (step S601), the host that instructs the execution of the job notifies the bus master of the size of the image data that is to be transmitted (step S602). Upon receiving the notification, the bus master adds a job ID to the job and stores the job in a job table (step S603).

FIG. 24 is a diagram for explaining an example job table. As is shown in FIG. 24, a job table consists of a "job ID" column in which job IDs are entered, a "data amount" column in which the remaining amount of data for jobs is stored, and a "data transmission speed" column in which the speed at which the data can be transmitted in one cycle is entered.

The bus master sorts jobs in accordance with the amount of data entered in the job table, and rearranges the jobs so that they are stored beginning with the job having the smallest amount of data (step S604). In the example in FIG. 24, the job that has the smallest amount of data remaining and that has the job ID number of "5" is entered at the top in the job table and is given the highest preference.

A check is performed to determine whether the bus is still available, i.e., whether there is an unused bus channel so that all the jobs can be executed at the same time (step S605). If the bus is still available, the use of the bus is permitted by the job that again requested the right of use of the bus at step S601, and all the jobs, including that job, are performed (step S606). Each time image data are transmitted during one cycle, a value stored in the data amount column that corresponds to the job ID of the job that is currently being executed is decremented by one (step S607).

After the value in the data amount column is decremented, a check is performed to determine whether there is a job that has been terminated, i.e., whether there is a job for which a value stored in the data amount column is "0" (step S608). If there is a job that has been terminated, to update the job table data concerning the job are deleted (step S609). Then, a check is performed to determine whether there is a job that has not yet been executed (step S610). If there is such a job, the process at step S606 is repeated.

When at step S608 there is no job that has been terminated, step S609 is skipped and the process at step S610 is performed.

If, at step S605, there is a job conflict and the bus is not available, jobs are performed beginning with the job that is the topmost one in the job table, i.e., the job that has the smallest amount of remaining data (step S611). Each time image data are transmitted during one cycle, the value stored in the data amount column that corresponds to the job ID of the job that is currently being executed is decremented by one (step S612).

When the value stored in the data amount column is decremented, a check is performed to determine whether there is a job that has been terminated, i.e., whether there is a job for which a value stored in the data amount column is "0" (step S613). When there is such a job, to update the job table data concerning the job are deleted (step S614). Sequentially thereafter, a check is performed to determine whether there has not yet been executed (step S615). If there is such a job, the process at steps S611 is repeated.

When, at step S613, there is no job that has been terminated, step S614 is skipped and the process at step S615 is performed.

When at step S610 or at step S615 there is no job that has not yet been executed, the processing is terminated.

In FIG. 22C are the timings for processing the jobs A to C as the result of the unfair arbitration. Since there is only one job at time t0 when job C occurs, job C can use the bus. Even when job A occurs at time t1, job C is executed continuously because the amount of data for job A is greater than the amount of data remaining for job when it has been partially processed before job A occurred. When job B occurs at time t2, job B is entered at the topmost preference position in the job table because the amount of data for job B is smaller than the amount of data remaining for job C in the processing performed up until time t2. Therefore, job B is executed at time t2. After job B is terminated, job C is executed, and after job C is terminated, job A is executed. As a result, the total execution time extending from the start of the three jobs A to C until their termination is 24. As is apparent, this is considerably shorter than is the total execution time of 30 that is required when fair arbitration is employed.

As is described above, in this embodiment, the 1394 serial bus is used for the transmission of image data. Isochronous packets are assigned for the transmission of image data, while asynchronous packets are assigned for the transmission of command statuses. In addition, when a plurality of jobs, including the transmission of image data, occur and the number of channels required can not be allocated for all the jobs, execution preference is determined in accordance with the lengths of the jobs, and the timings for executing the jobs are dynamically changed in accordance with the execution preference. Even when a command status and color image data, the amount of which are comparatively large, are to be transmitted, or when a conflict arises among a plurality of jobs for which the transmission of image data is required, image data can be steadily transmitted at a high speed without using a parallel bus and by using only a serial bus.

In this embodiment, the image processing system is constituted by connecting together a plurality of apparatuses (the hosts 1 to 4 and the printers 4 to 6) using the 1394 serial bus 7. The same effect can be obtained by interconnecting, with the 1394 serial bus, a plurality of modules (e.g., an image reader, an image output device and a controller) that are included in a single image processing apparatus. In this case, for example, an image processing unit that controls the entire apparatus serves as the identification means, the preference determination means, and the change means of the present invention.

Second Embodiment

Figure 26A:
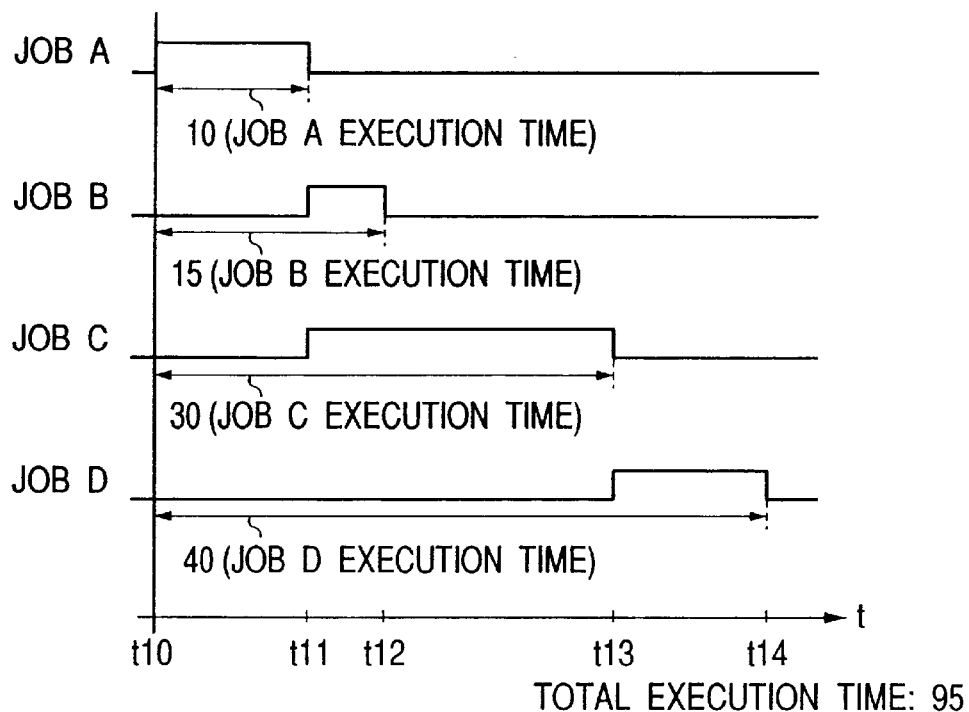
FIGS. 26A and 26B are timing charts showing the timing for the processing of four jobs, A to D, in this embodiment.
Figure 26B:
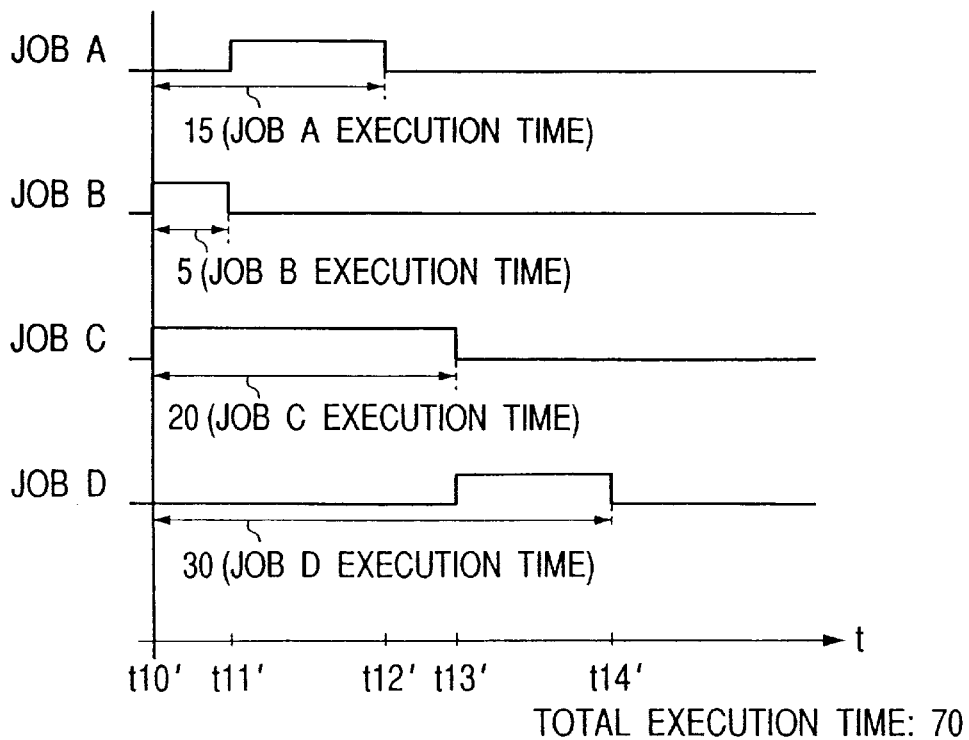

A second embodiment of the present invention will now be described while referring to FIGS. 25 and 26A and 26B.

This embodiment differs from the first embodiment in that when a job that must use a plurality of channels occurs, instead of the amount of data assigned for the individual channels, the "necessary channel count×necessary cycle count" is entered as the amount of data in a job table and the job preference jobs is determined in accordance with the amount of data. That is, in this embodiment, the jobs are performed beginning with the job having the smallest "necessary channel count×necessary cycle count" value.

Furthermore, when the upper limit of the number of bus channels that can be used at the same time is small, or when a plurality of jobs have the same "necessary channel count× necessary cycle count" value, a higher preference is provided for a job having a smaller "necessary channel count" value. When the upper limit of the number of bus channels that can be used at the same time is sufficiently large and a plurality of jobs have the same "necessary channel count× necessary cycle count" value, higher preference is provided for a job having a smaller "necessary cycle count" value.

FIG. 25 is a job table for explaining a job preference setting method for a printing system that serves as an image processing system according to the second embodiment of the present invention. FIGS. 26A and 26B are timing charts showing the processing timings for four jobs A to D that are entered in the job table.

Suppose that the maximum number of available channels is "10". As is shown in FIG. 26A, to perform the jobs in accordance with the job IDs and without employing the above described preference determination method, first, job A is performed at time t10. At time t11, whereat job A is terminated, job B is initiated. However, since the number of channels required for the job B is five, job C is begun at the same time as job B is initiated. When job B is terminated, job D is not initiated because the number of channels required for job D is ten while the number of channels required for the C is four. When at time t13 job C is terminated, the channels required for job D are available, and job D is begun. When the four jobs are performed in this manner, the total time extending from the time at which the execution of job A was begun and continuing up until the execution of job D is terminated is "95".

When the above described preference determination method is employed, the highest preference is provided for job B, which has the smallest "channel count×cycle count". While job A and job C have the same "channel count×cycle count" value, job C has a smaller "necessary channel count" value, so that the second highest preference is provided for job C. The third highest preference is provided for job A, and the fourth highest preference is provided for job D.

When the preferences have been determined, the jobs are performed. In FIG. 26B is shown the timings for executing jobs A to D in accordance with their assigned preferences. As is shown in FIG. 26B, when the preferences are determined in accordance with the "channel count×cycle count" value, the total execution time is "70". Compared with the execution of the four jobs A to D in accordance with the job IDs, the execution of the jobs can be completed in a considerably shorter period of time.

As is described above, in this embodiment, even when a conflict exists among a plurality of jobs, the preferences for processing the jobs are determined in accordance with the "channel count×cycle count" value. Therefore, the processing can be performed at a higher speed and the productivity of the image processing system that is provided the user can be increased.

When the system in this embodiment includes a speed absorption buffer, a plurality of available channels can be allocated at the same time for a job that has a higher preference. With this arrangement, the time for the execution of the jobs can be further reduced.

As is described above, according to the first and second embodiments, a plurality of modules are connected via a high-speed serial bus along which at least one isochronous packet and at least one asynchronous packet, which are assigned for a predetermined number of channels, can together be sequentially transmitted during one transmission cycle. And the transmission of image data is performed among the plurality of modules by assigning the isochronous packet for the transmission of image data to the modules and by assigning the asynchronous packet for the transmission of a command status to the modules. Furthermore, provided are determination means for, when a plurality of jobs, including the transmission of image data, has occurred, determining whether the number of channels that the jobs require during one cycle can be obtained; preference determination means for, when the determination means determines that the number of channels required can not be obtained, determining the preferences for the jobs in accordance with the periods of time required to execute the jobs; and change means for dynamically changing the execution timings of the jobs in accordance with the preferences determined by the preference determination means. Therefore, when a command status and color image data, the amount of which is comparatively large, are to be transmitted, or when a conflict exists among a plurality of jobs requiring the transmission of image data, the image data can be steadily transmitted at a high speed without using a parallel bus and by using only a serial bus.

According to the above embodiments, since the preference determination means provides a high preference for a job that has a short execution time, even when a conflict exists among a plurality of jobs requiring the transmission of image data, image data can be transmitted at a higher speed.

According to the above embodiments, when a new job including the transmission of image data occurs, the preference determination means re-determines the preferences for the jobs in accordance with a remaining time required for the execution of the jobs and a time required for the execution of the new job. Therefore, even when a new job occurs, the waiting time for all the jobs to be executed at that time can be kept as short as possible.

According to the first and second embodiments, a plurality of modules are connected via a high-speed serial bus along which at least one isochronous packet and at least one asynchronous packet that are assigned for a predetermined number of channels can together be sequentially transmitted during one transmission cycle. And the transmission of image data to the plurality of modules can be performed by assigning the transmission of the image data to the modules to the isochronous packet and by assigning the transmission of a command status to the modules to the asynchronous packet. Furthermore, provided are determination means for, when a plurality of jobs, including the transmission of image data, have occurred, determining whether the number of channels that the jobs require during one cycle can be obtained; preference determination means for, when the determination means determines that the number of channels required can not be obtained, determining the preferences for the jobs in accordance with the total volume of image data to be transmitted for the individual jobs; and change means for dynamically changing the execution timings for the jobs in accordance with the preferences determined by the preference determination means. Therefore, when a command status and color image data, the amount of which is comparatively large, are to be transmitted, or when a conflict exists among a plurality of jobs requiring the transmission of image data, the image data can be steadily transmitted at a high speed without using a parallel bus and by using only a serial bus.

According to the embodiments, since the preference determination means provides a high preference for a job for which the total volume of image data to be transmitted is small, even when a conflict exists among a plurality of jobs requiring the transmission of image data, image data can be transmitted at a higher speed.

According to the embodiments, when there are a plurality of jobs to be transmitted that have the same total volume of image data, the preference determination means provides a high preference for a job that requires only a few channels for the transmission of the image data. Thus, even when a conflict exists among a plurality of jobs requiring the transmission of image data, image data can be transmitted at a higher speed.

According to the embodiments, when there are a plurality of jobs that have the same total volume of image data to be transmitted, the preference determination means provides a high preference for a job that requires only a few channels for the transmission of the image data. Thus, even when a conflict exists among a plurality of jobs requiring the transmission of image data, image data can be transmitted at a higher speed merely by using the serial bus.

According to the embodiments, when a new job including the transmission of image data occurs, the preference determination means re-determines the preferences for the jobs in accordance with the volume of the data remaining for the jobs and the volume of the data for the new job. Therefore, even when a new job occurs, the waiting time for all the jobs to be executed at that time can be kept as short as possible.

According to the embodiments, when there are a plurality of jobs that can be executed at the same time, different channels are assigned to these jobs. Therefore, even when a conflict exists among a plurality of jobs requiring the transmission of image data, image data can be transmitted at a higher speed without using the parallel bus and by using only the serial bus.

According to the embodiments, provided is channel count change means for changing a predetermined number of channels that are allocated for an isochronous packet in accordance with the processing speed available at a plurality of modules (apparatuses). Therefore, the image data can be transmitted as fast as possible by effectively using the total volume of image data to be transmitted for each unit of time for the fast serial bus.

According to the embodiments, in a plurality of modules (apparatuses) are included modules (devices) having different processing speeds. To transmit image data along the fast serial bus to the different modules (apparatuses), the processing speed of the module having the lowest speed is employed. Therefore, all the image data can be steadily transmitted to modules or apparatuses that have different processing speeds.

Third Embodiment

Figure 27:
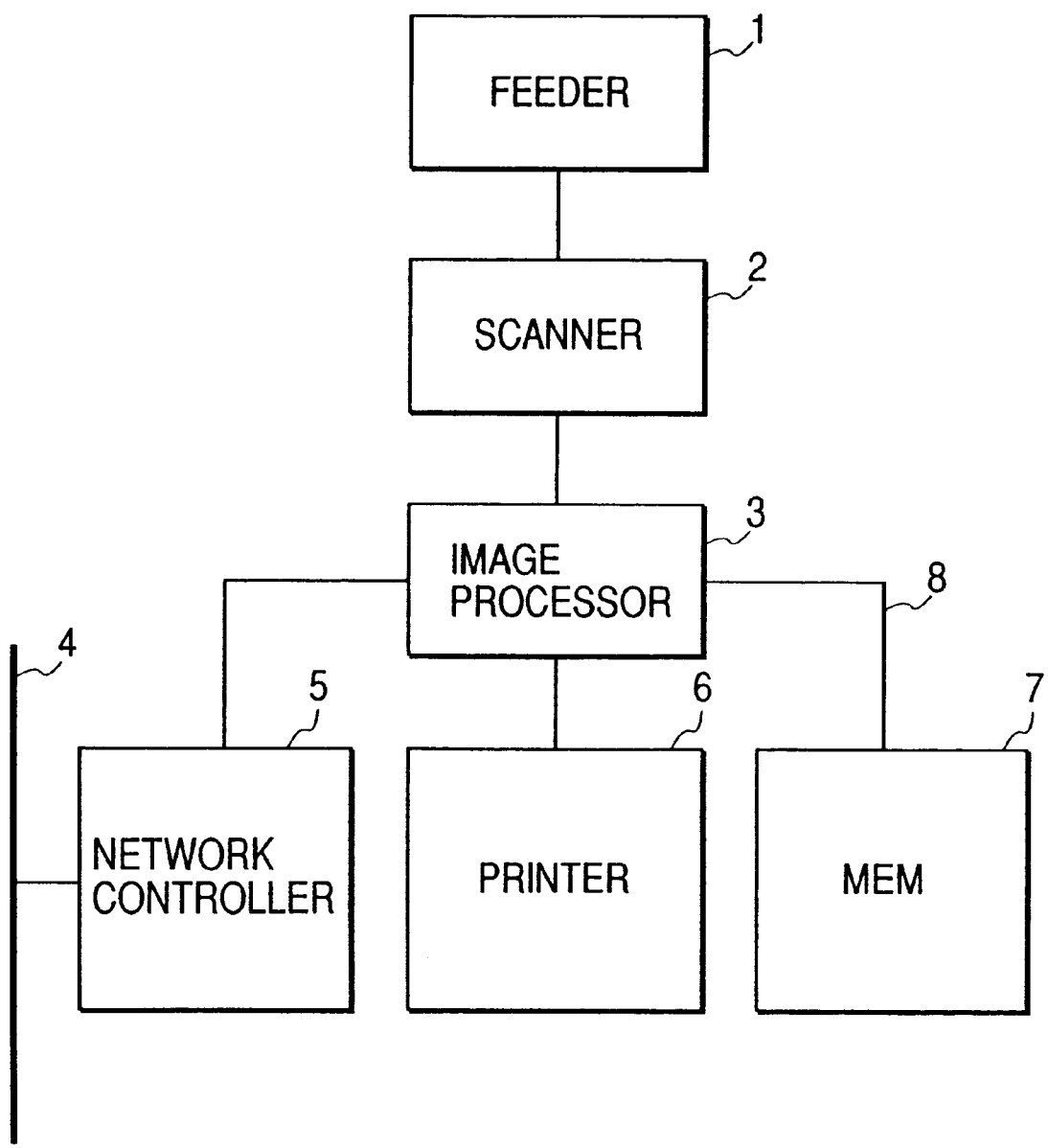
FIG. 27 is a block diagram showing the arrangement of a copier system that serves as an image processing apparatus according to a third embodiment of the present invention.

FIG. 27 is a block diagram illustrating the arrangement of a copier system that serves as an image processing system according to a third embodiment.

In FIG. 27, the copier system comprises: a feeder 1, a scanner 2, an image processor 3, a network controller 5 connected to a network such as a LAN 4, a printer 6, and a storage device 7. The individual components are interconnected via a 1394 serial bus.

Figure 28:
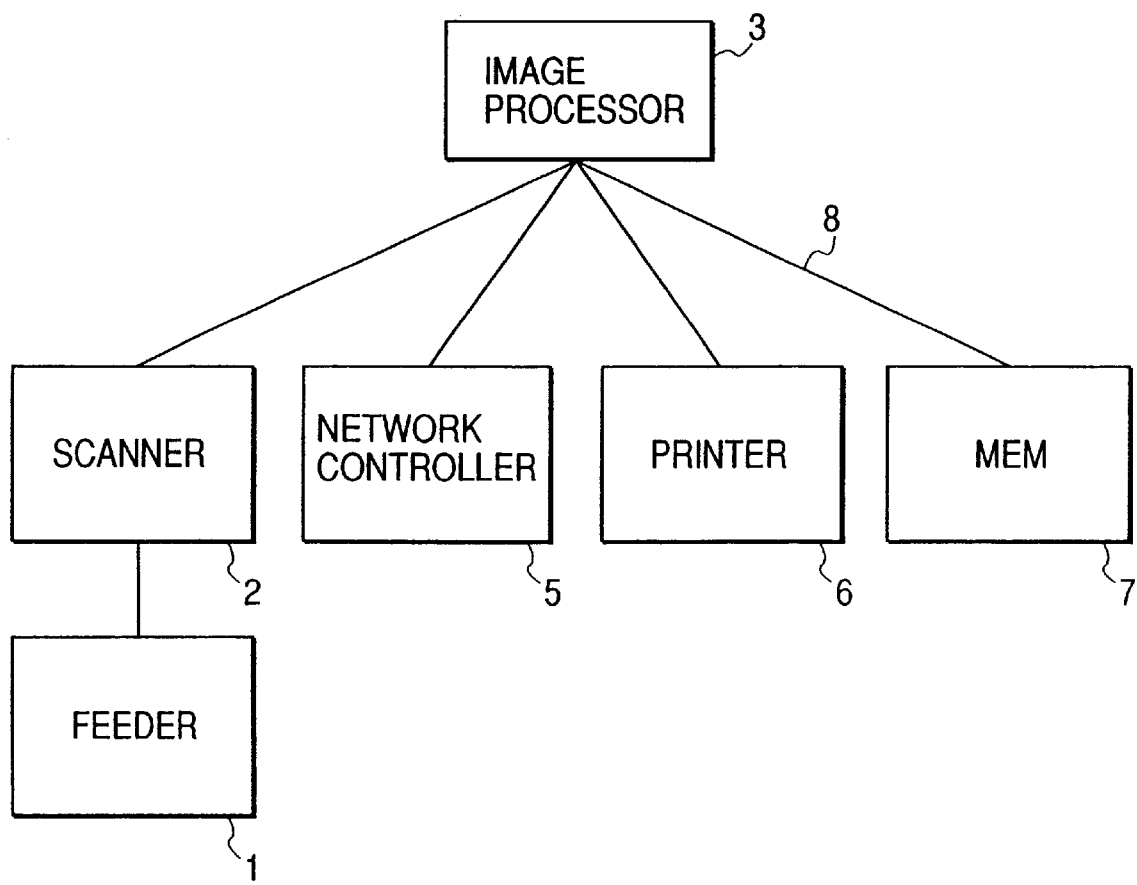
FIG. 28 is a diagram showing a network that comprises the components of the copier system shown in FIG. 27 and that serves as an image processing system.

FIG. 28 is a diagram showing a network that is constituted by the components of the copier system in FIG. 27 and that serves as an image processing system. As is apparent from FIG. 28, in the following description the image processor 3 serves as the root, the scanner 2 serves as a branch, and the feeder 1, the network controller 5, the printer 6 and the storage device 7 serve as leaves.

Figure 29:
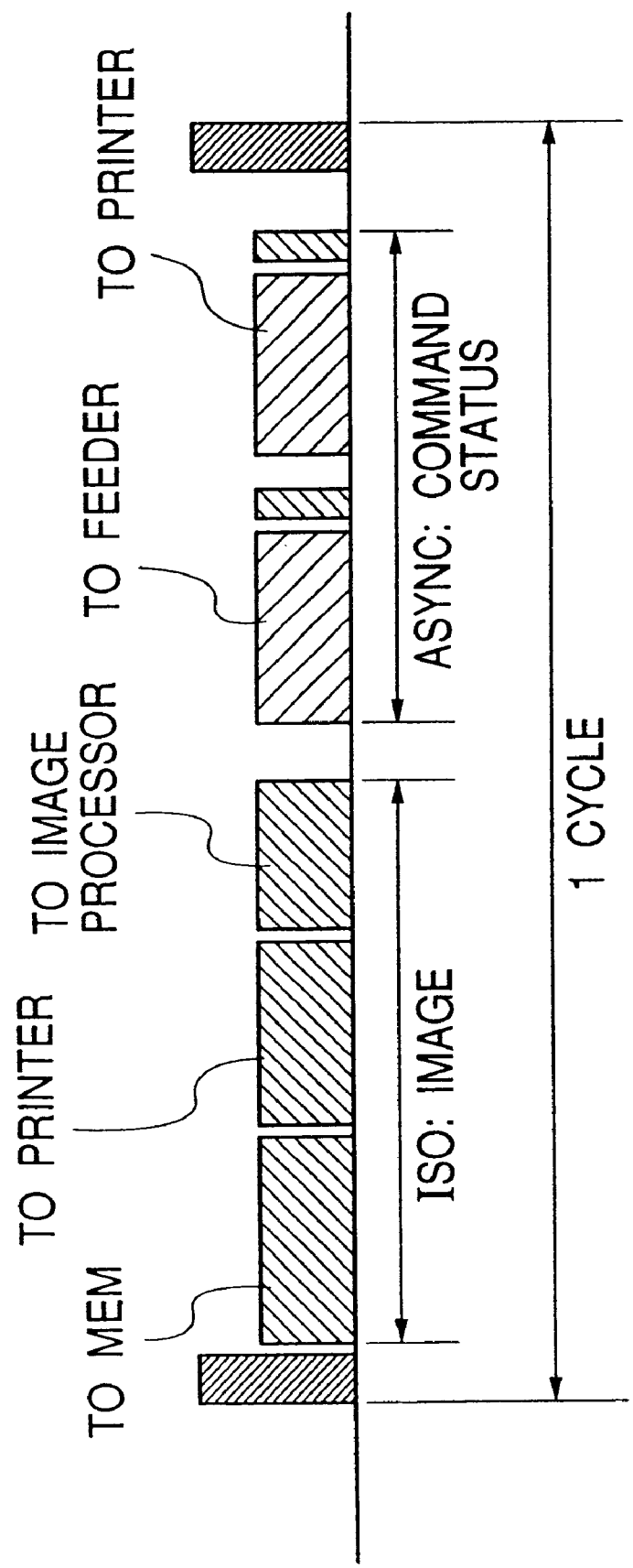
FIG. 29 is a specific diagram showing a bus cycle when two jobs are performed at the same time.

In this embodiment, an isochronous packet for which one or more channels (channels e, s and k) are assigned is used for the transmission of image data to the individual components (modules), while an asynchronous packet is used for the communication of a command or a status to the modules. FIG. 29 is a specific diagram for explaining a bus cycle for the transmission of image data.

The amount of data for a 24-bit image, called a full color image, for one sheet of A4 is approximately 100 MB with a resolution of 600 dpi. To transmit the image data to the printer 5 at a rate of six sheets a minute, the number of channels equivalent to 10 MB/sec=1.25 KB/cycle must be prepared for the image communication. Assuming that 1.25 KB/cycle can be prepared using one channel, and that a job "feeder 1 to scanner 2 to storage device 7" and a job "network controller 5 to image processor 3 to printer 6" are executed, a packet shown in FIG. 29 is transmitted at the speed of a bus cycle for the 1394 serial bus.

In the above calculation, the premise is that the right of use of the bus can always be obtained during the image transmission. However, when the above described ordinary arbitration is performed, the right of use of the bus can not be obtained for each cycle. In a system that performs arbitration (fair arbitration) to provide all the modes the equal right of use of the bus, when there is a job conflict and the bus resources are in short supply, the right of use of the bus can not be obtained each cycle by the same node.

The fair arbitration will now be explained while referring to FIGS. 30 and 31.

Figure 30:
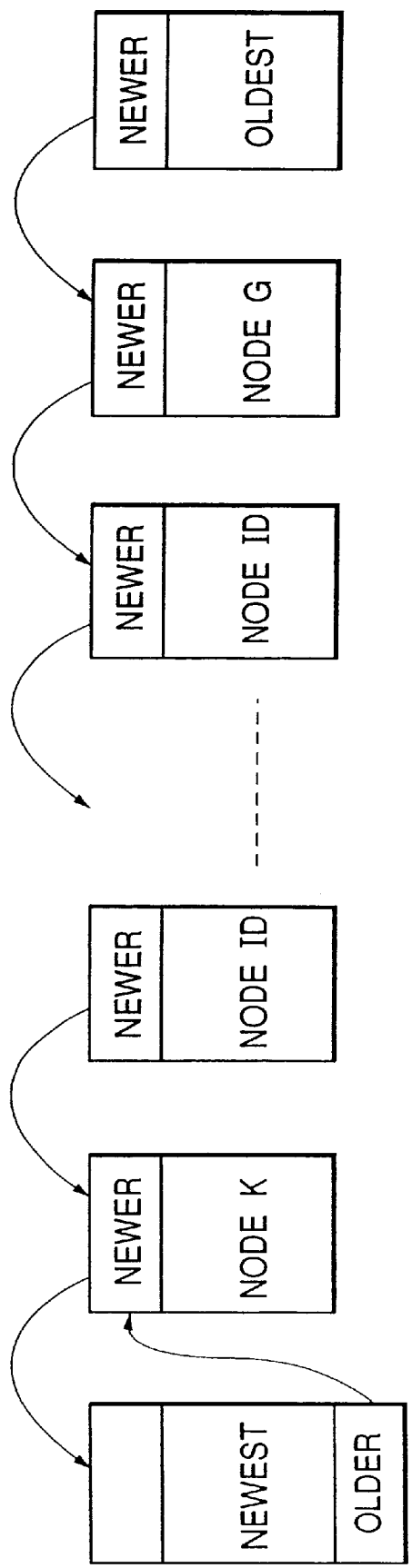
FIG. 30 is a link table showing, as a time series, nodes that obtain the right of use of the bus as a result of the fair arbitration.
Figure 31:
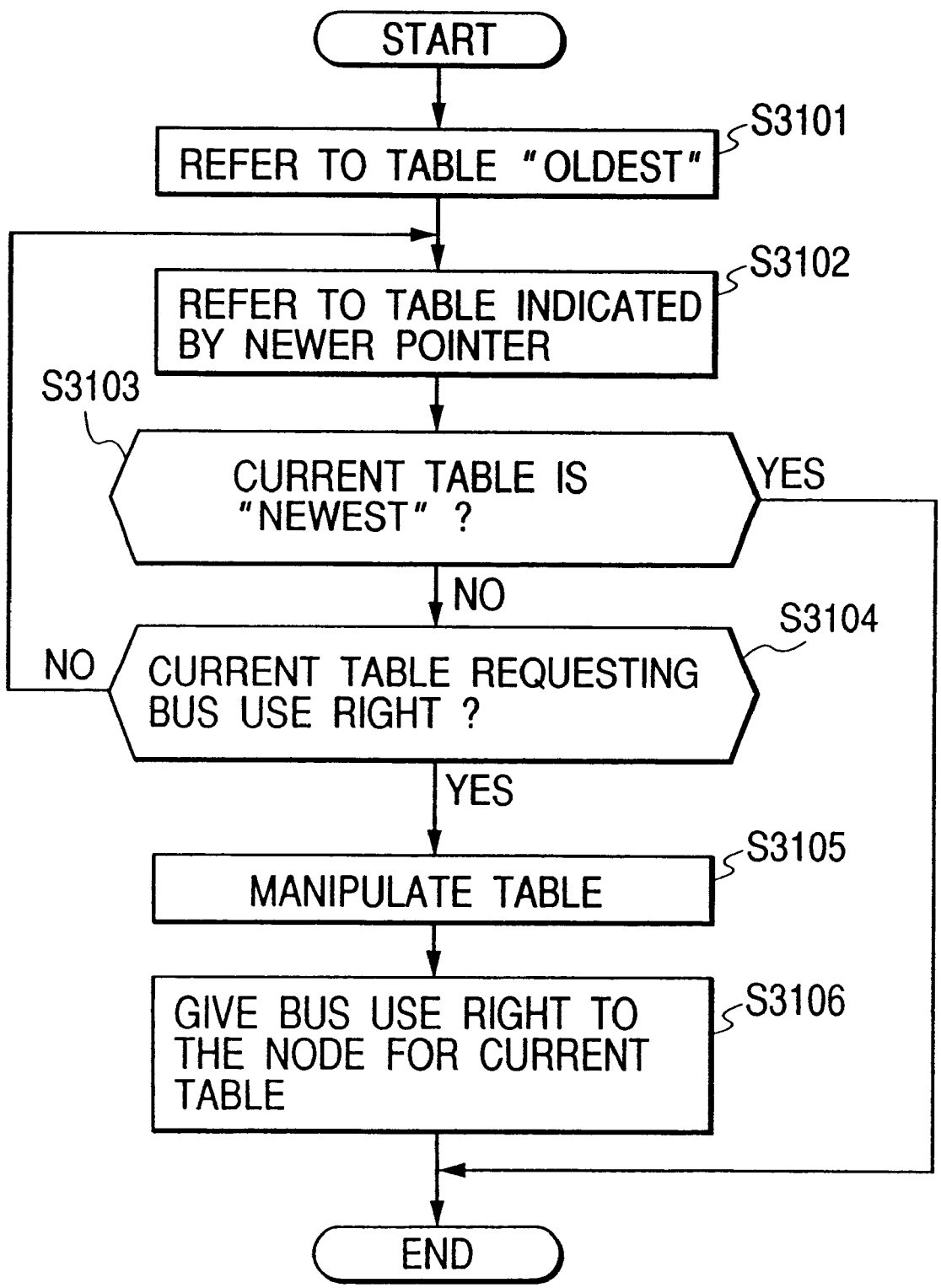
FIG. 31 is a flowchart showing the fair arbitration processing.

FIG. 30 is a link table showing as a time series nodes that obtain the right of use of the bus. FIG. 31 is a flowchart showing the determination processing performed as a result of the fair arbitration. In this embodiment, the arbitration is performed by the image processor 3 that serves as the root (arbiter).

Since with fair arbitration the right (permission) of use of the bus is provided for the first node that is selected to use the bus, as is shown in FIG. 30 the bus acquisition nodes are arranged in, for example, a RAM (not shown) in the image processor 3 in the order beginning with the oldest.

An "Oldest" table is referred to in which is stored information concerning the first node that obtained the right of the use of the bus (step S3101). A search of a table pointed at by a Newer pointer is performed to determine whether there is a node that has not yet obtained the right of use of the bus (step S3102). If such a node is found in the network (suppose this node is node G), a check is performed to determine whether the table that is currently referred to is a Newest table in which is stored information concerning the latest mode that obtained the right of use of the bus (step S3103). When the current table is the Newest table, the arbitration need not be performed, and the processing is thereafter terminated.

When the result of the decision at step S3103 is negative (NO), a check is performed to determine whether node G has issued a request for the right of use of the bus (step S3104). When node G has issued a request, the table is manipulated to provide the right (permission) of use of the bus for node G (step S3105). That is, the contents of the Newer pointer in node G in which its ID information is stored are copied to the Newer pointer of the Oldest area. Further, the address of node G is copied to the Newer pointer in the table that is pointed at by the Older pointer in the Newest area in which is stored information concerning the latest node that the right of use of the bus. The address of node G is also copied to the Older pointer in the Newest area. In addition, the address in the Newest area is copied to the Newer pointer of node G. As a result, node G, which obtains the right of use of the bus, is treated as the latest node in the link table that obtained the right (permission) of use of the bus. After the manipulation of the table, the right of use of the bus is provided for a node that corresponds to the table that is currently referred to (step S3106). The processing is thereafter terminated.

Even when node G is regarded as a node in the network that has not yet obtained the right of use of the bus, so long as node G does not request the right of use of the bus (the decision at step S3104 is negative (NO)) the table pointed at by the Newer pointer in the node G is examined at steps S3102 to S3104.

When the bus used for the fair arbitration is employed, the time at which the image transmission is completed is easily changed, depending on how busy the bus is. To increase the processing speed, a copier may predict the image transmission end time before all the image data to be printed are prepared, and begin the printing. A bus that can not guarantee the image communication end time can not be used for such an apparatus that requires real time processing.

To avoid this, in this embodiment arbitration that is not fair (unfair arbitration) is performed, so that the node that just obtained the right of use of the bus can the next cycle again obtain the right of use of the bus.

Figure 32:
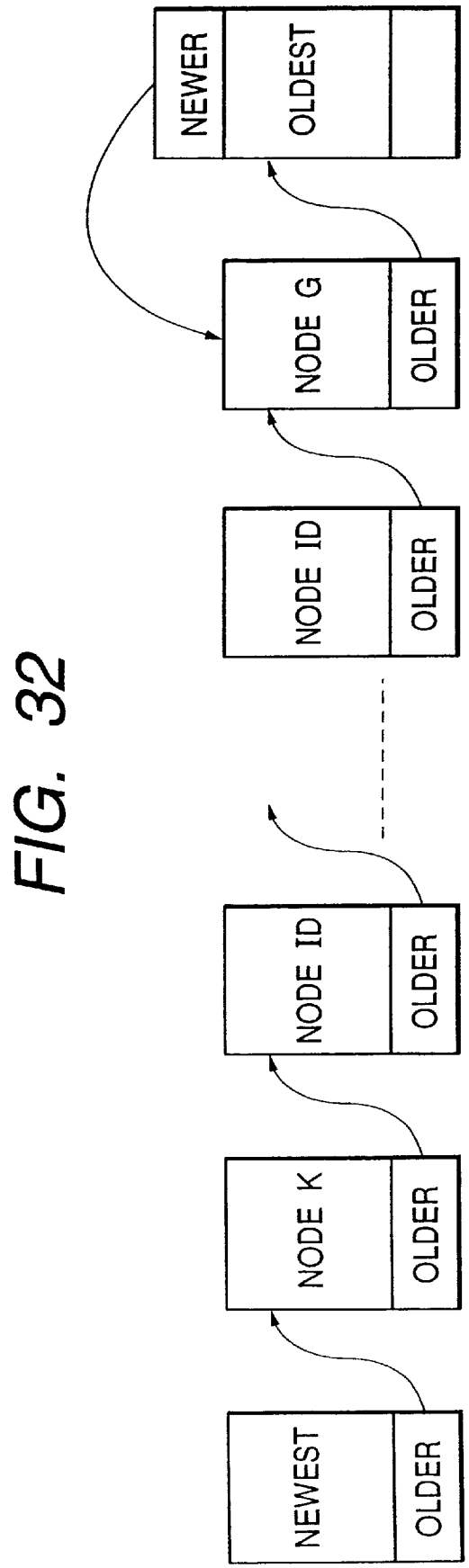
FIG. 32 is a link table showing, as a time series, nodes that obtain the right of use of the bus as a result of the unfair arbitration.
Figure 33:
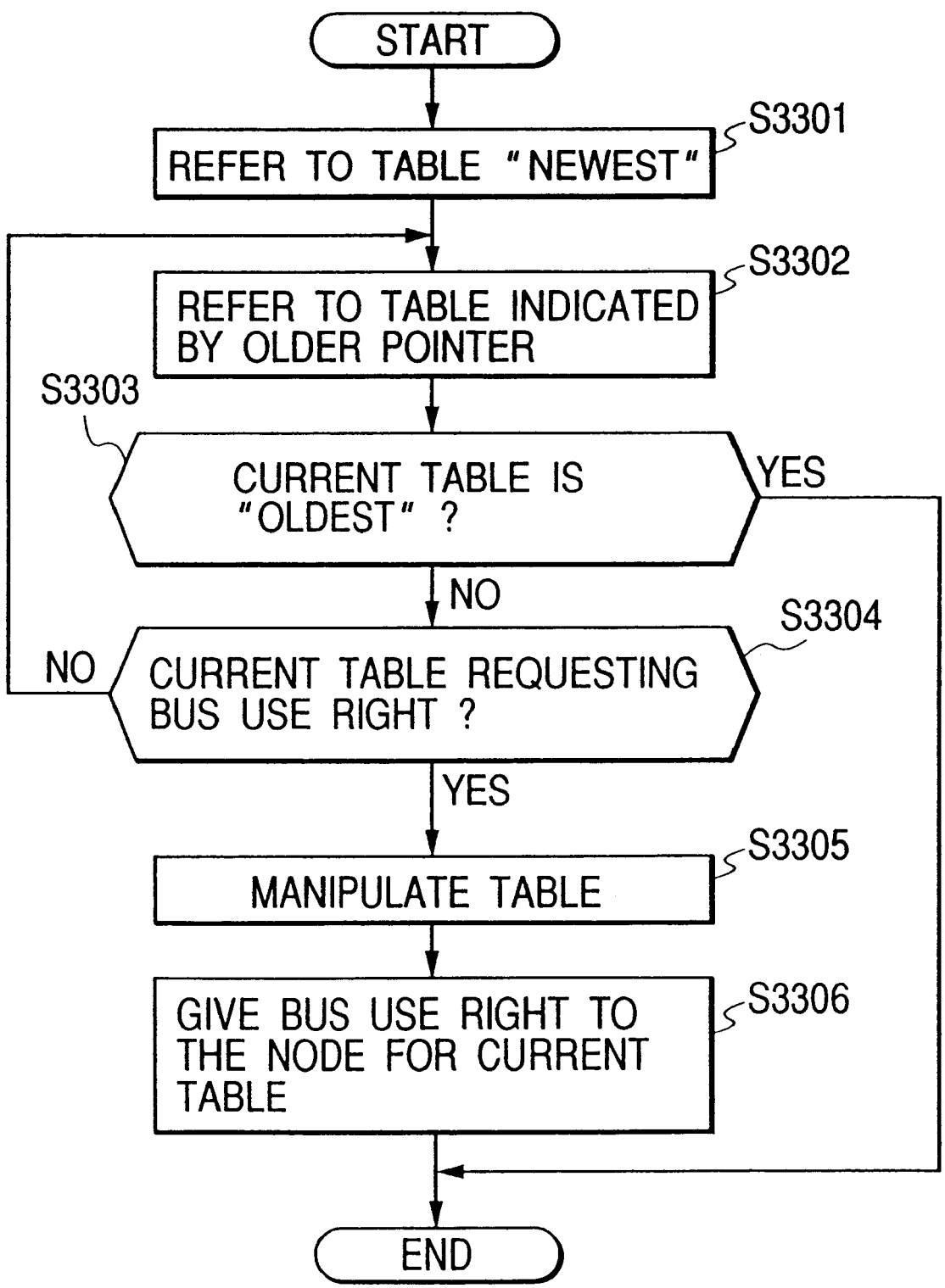
FIG. 33 is a flowchart showing the unfair arbitration processing.

FIG. 32 is a link table showing as a time series the processing for obtaining the bus as the result of unfair arbitration. FIG. 33 is a flowchart showing the unfair arbitration processing that is performed at steps S406 and S407 in FIG. 16.

Since with fair arbitration the right (permission) of use of the bus is provided for the latest node that obtained the right of use of the bus, the bus acquisition nodes are arranged in order beginning with the newest, as is shown in FIG. 32.

A "Newest" table is referred to in which is stored information concerning the last (the latest) node that obtained the right of the use of bus (step S3301). A table pointed at by an Older pointer in the Newest area is searched to determine whether there is a preceding node that obtained the right of use of bus (step S3302). If such a node is found, the node number is stored in the Newest table. This node is referred to as node K. A check is performed to determine whether the table that is currently referred to is an Oldest table in which is stored information concerning the first node that obtained the right of use of the bus (step S3303). When the current table is the Oldest table, the arbitration need not be performed, and the processing is thereafter terminated.

When the result of decision at step S3303 is negative (NO), a check is performed to determine whether node K has issued the request for the right of use of the bus (step S3304). When node K has issued the request, the table is manipulated to provide the right (permission) of use of the bus for node K (step S3305). That is, the contents of the Older pointer in node K are copied to the Older pointer in the table that is pointed at by the Newer pointer of node K. The contents of the Older pointer in the Newest area are copied to the Older pointer of the node K. In addition, the address of node K is copied to the Older pointer of the Newest area. As a result, node K, which obtains the right of use of the bus, is treated as the latest node in the link table to obtain the right of use of the bus.

After the above described table manipulation, the right of use of the bus is given to a node that corresponds to the table that is currently referred to (step S3306). The processing is thereafter terminated.

If node K does not issue a request for the right of use of the bus, even though node K is identified (when the decision at step S3304 is negative (NO)), the table pointed at by the Older pointer in node K is examined at steps S3302 to S3304.

With this arrangement, once a job for the transmission of image data is started, the right of use of the bus is ensured until the transmission is completed. Therefore, no problem arises when the 1394 serial bus is employed for the above described copier system that predicts the image communication end time and that requires real time processing.

As is described above, according to the embodiment, even when a conflict exists among a plurality of jobs that require the transmission of image data, such as a command status and color image data, the amount of which is comparatively large, the right of use of the bus is ensured until the transmission is completed. Therefore, a copier system wherein a plurality of apparatuses are interconnected by the serial bus can constantly perform image processing at a high speed.

In this embodiment, an image processing system is constituted by a plurality of image processing apparatuses (e.g., a feeder, a printer and a scanner). The IEEE1394-1995 (hereinafter referred to simply as a 1394 serial bus) is employed as a digital interface for connecting together these image processing apparatuses. The present invention, however, is not limited to this arrangement. To obtain the same effect, for example, the IEEE1394-1995 can be used as a digital interface for connecting a plurality of modules that constitute a single image processing apparatus.

In this embodiment, unfair arbitration is always performed. However, fair arbitration and unfair arbitration can both be performed depending on the existing conditions.

Specifically, a table is prepared for a node that obtained the right of use of the bus for the preceding bus cycle. Unfair arbitration is performed so that a request to obtain the right of use of the bus that is stored in this table and that was issued by this node is accepted first, as in the first embodiment, and then fair arbitration is performed for the requests issued by the other nodes to obtain the right of use of the bus. With this arrangement, when a node that has issued a request for the right of use of the bus has a lower preference (if the node did not recently issue the request), the time required for the arbitration is shorter than is that for the above embodiment.

Fourth Embodiment

A fourth embodiment of the present invention will now be described while referring to FIGS. 34 and 35.

In the third embodiment, the right of use of the bus is provided first and continuously for node K, which obtained the right of use of the bus for the preceding bus cycle. In the fourth embodiment, the right of use of the bus is ensured in accordance with a command from a node, i.e., in accordance with the need of a user. An image processing system according to this embodiment can be implemented by employing the arrangement in FIGS. 27 and 28 for the third embodiment.

Figure 34:
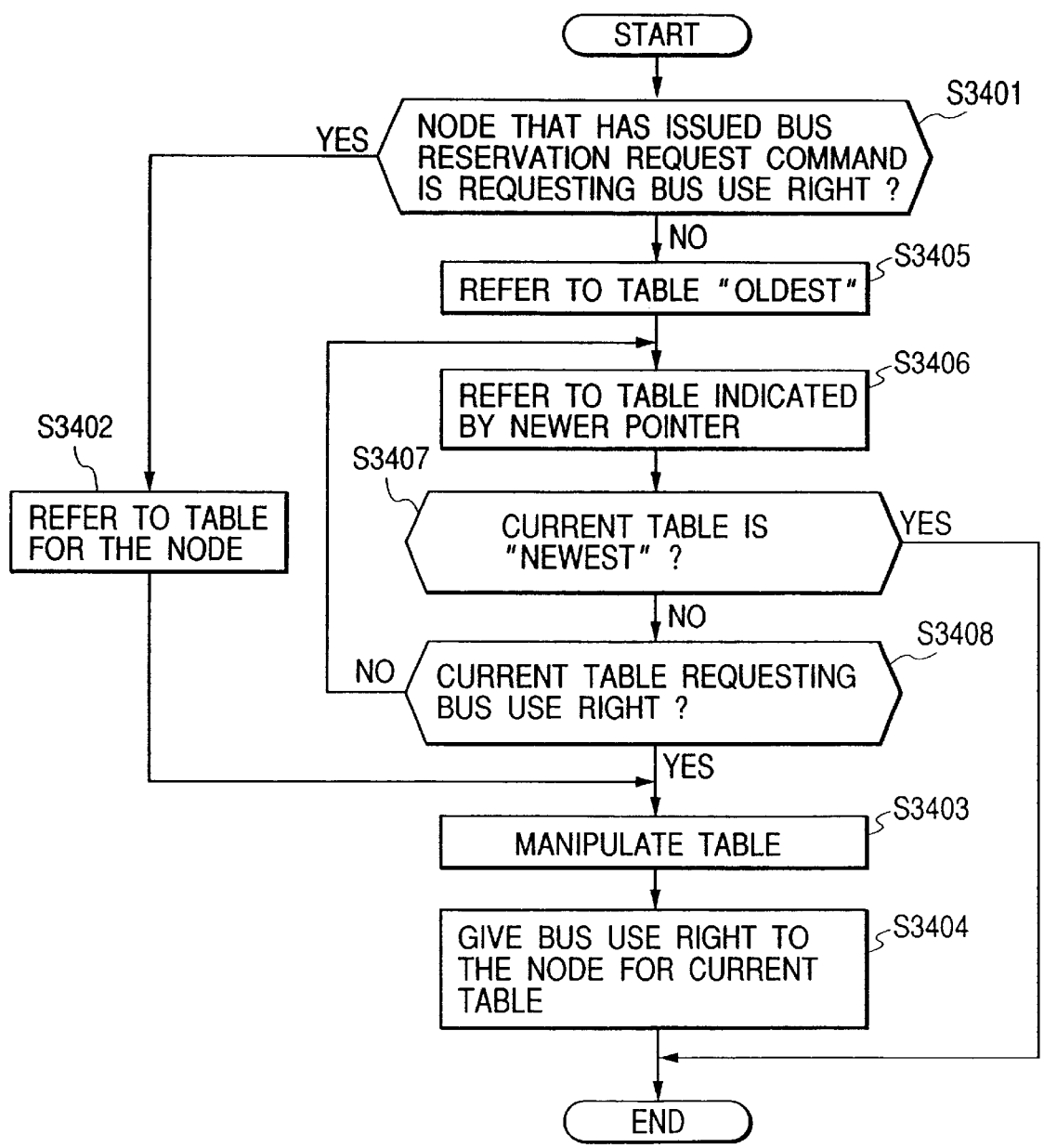
FIG. 34 is a flowchart showing the unfair arbitration performed by an image processing system according to a fourth embodiment of the present invention.

FIG. 34 is a flowchart showing the unfair arbitration processing performed, in accordance with a command, by the image processing apparatus that serves as the root of an image processing system according to this embodiment.

A plurality of nodes connected to the image processing system issue bus reservation request commands to the root in order to start the transmission of image data. A bus reservation request command is a command for requesting the root to first provide the right of use of the bus and to then provide the right of use of the bus sequentially for the following bus cycles, in order to prevent the interruption of the transmission of image data.

First, a check is performed to determine whether a node that has requested the right of use of the bus is the node that has issued a bus reservation request command to the root (step S3401).

When at step S3401 the node requesting the right of use of the bus is the node that has issued the command (hereinafter referred to as node b), the table for node D is referred to step S3402. Table manipulation is performed, such as copying the contents of the current table to the latest node that has obtained the bus, and the node for the current table is permitted to use the bus (steps S3403 and S3404). The processes at step S3403 and S3404 are the same as those at steps S3305 and S3306 in FIG. 33.

When, at step S3401, the node that requests the right of use of the bus did not issue the bus reservation request command, the processing beginning at step S3405 is performed. The processing at steps S3101 to S3104 in FIG. 31, i.e., fair arbitration, is performed at steps S3405 and S3408. When the decision at step S3408 is affirmative (YES), the process at step S3403 is performed.

In this manner, the node that issued the bus reservation request command to the root can obtain the right of use of the bus when it issues the following request.

Figure 35:
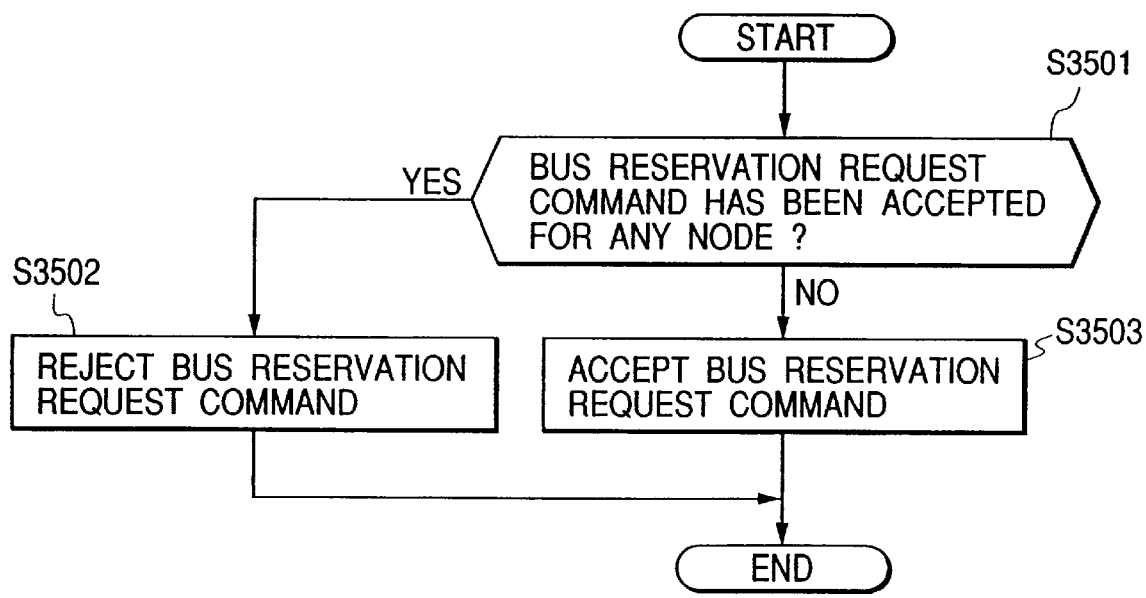
FIG. 35 is a flowchart showing the bus acquisition determination processing.

FIG. 35 is a flowchart showing the bus reservation determination processing for determining whether the preference for the reservation of the right of use of the bus should be provided for a node that issues a bus reservation request command to the root.

When a bus reservation request command is issued by one of a plurality of nodes connected to a system via the 1394 serial bus, the root initiates the processing in FIG. 35. Specifically, a check is performed to determine whether there is a node from which a bus reservation request command has already been accepted (step S3501). When the decision is affirmative (YES), the bus reservation request command is not accepted (step S3502). When the decision is negative (NO), the bus reservation request command is accepted (step S3503).

Through the processing performed by the root, a bus reservation request from only one node will be accepted for one network.

As is described above, in this embodiment, when a node transmits image data, it issues a bus reservation request command to the root in advance, and the preference is provided for the request for obtaining the right of use of the bus from the node. Therefore, even when a conflict exists among a plurality of jobs that require the transmission of image data, the right of use of the bus is ensured until the transmission has been completed. As a result, a copier system wherein a plurality of apparatuses are interconnected by the serial bus can steadily perform image processing at a high speed.

Fifth Embodiment

A fifth embodiment of the present invention will now be explained while referring to FIG. 36.

In the fourth embodiment, a bus reservation request is accepted only from one node, while in this embodiment, bus reservation requests are accepted from a plurality of nodes.

Specifically, of all the channels of the 1394 serial bus, a plurality of channels are allocated as bus reservation channels. When bus reservation requests are issued by nodes, the bus reservation channels are assigned one by one to these nodes, beginning with the first node that issued a request. The allocated channel is used as a dedicated channel for the node, regardless of whether image data are to be actually transmitted across the channel. In addition, when a specific node does not issue a bus reservation request command before it requests the right of use of the bus, unfair arbitration, as in the first embodiment, is performed for channels other than those used for bus reservations. It should be noted that, when a node does not issue a bus reservation command, channels that have not yet been allocated for bus reservations, even though they are prepared for bus reservations, may be included in the target channels for unfair arbitration.

Figure 36:
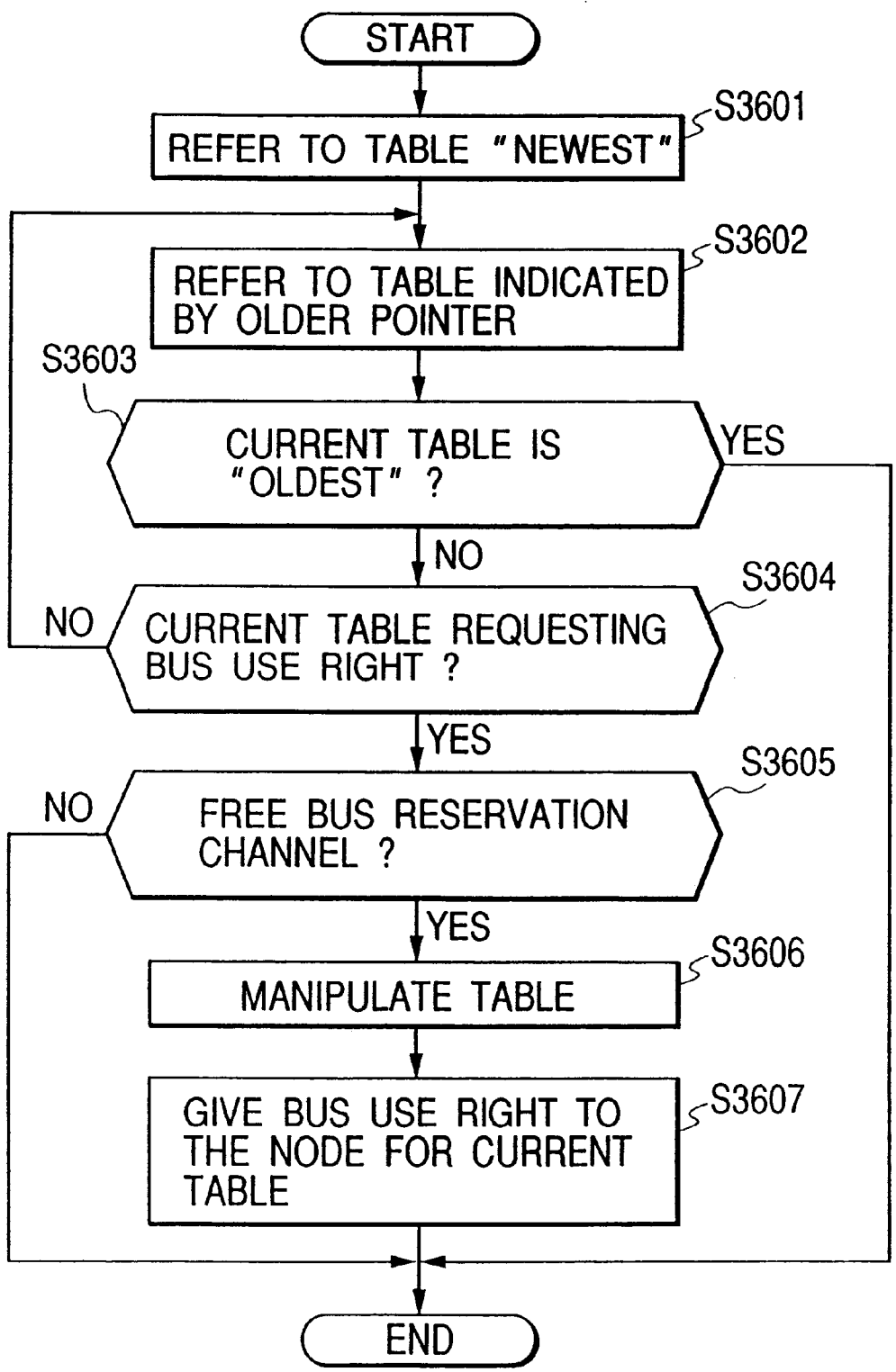
FIG. 36 is a flowchart showing the unfair arbitration performed by an image processing system according to a fifth embodiment of the present invention.

FIG. 36 is a flowchart showing the unfair arbitration processing that is performed in the image processing system according to this embodiment. This processing is performed at steps S406 and S407 in FIG. 16 by the image processor 3 that serves as the root.

This processing is initiated upon receiving from a specific node a request for the right of use of the bus to transmit image data and a bus reservation request command.

A "Newest" table is referred to in which is stored information concerning the last (latest) node that obtained the right of the use of the bus (step S3601). A table pointed at by an Older pointer in the Newest area is searched to determine whether there is a preceding node that obtained the right of use of the bus (step S3602). If such a node is found, the node number is stored in the Newest area. A check is performed to determine whether the table that is currently referred to is an Oldest table in which is stored information concerning the first node that obtained the right of use of the bus (step S3603). When the current table is the Oldest table, the arbitration need not be performed, and the processing is thereafter terminated. In this case, the bus reservation request command and the request for the right of use of the bus are accepted, and the pertinent channel is assigned and dedicated for the use of the node that requested the right until the transmission of image data has been completed and a bus reservation cancel command has been received.

When the result of the decision at step S3603 is negative (NO), a check is performed to determine whether the node for the table that is currently referred to has issued a request for the right of use of the bus (step S3604). If the node has not issued a request, the processing at steps S3602 to S3604 is repeated. When, at step S3604, a request for the right of use of the bus has been issued, a check is performed to determine whether there is a channel free for a bus reservation (step S3605). This determination is performed by referring to a channel management table stored in a RAM (not shown).

When there is no channel free for a bus reservation, the bus reservation request can not be accepted, and the processing is thereafter terminated. If there is a channel free for a bus reservation, table manipulation is performed to provide, for the node, the right of use of the bus for the free channel (step S3606). That is, the contents of the Older pointer in the node are copied to the Older pointer in the table that is pointed at by the Newer pointer at the node. The contents of the Older pointer in the Newest area are copied to the Older pointer at the node. In addition, the address of the node is copied to the Older pointer in the Newest area. As a result, the node that has obtained the right of use of the bus is treated as the latest node in the link table that has obtained the right of use of the bus.

After the above described table manipulation, the right of use of the bus is given to a node that corresponds to the table that is currently referred to (step S3607). The processing is thereafter terminated.

If the node does not issue a request for the right of use of the bus, even though the node is identified (when the decision at step S3604 is negative (NO)), the table pointed at by the Older pointer at the node is examined at steps S3602 to S3604.

As is described above, according to this embodiment, when a request for the bus reservation is issued by a specific node and is accepted, once an image data transmission job is started the right of use of the bus is ensured until the transmission has been completed. Therefore, no problem arises when the 1394 serial bus that adopts only ordinary fair arbitration is employed for the above described copier system that predicts the image communication end time and requires real time processing.

As is described above, according to the embodiment, a plurality of modules are connected via a high-speed serial bus along which at least one isochronous packet and at least one asynchronous packet that are assigned for a predetermined number of channels can be sequentially transmitted together during one transmission cycle. And the transmission of image data to the plurality of modules is performed by assigning to the isochronous packet the transmission of image data to the modules and by assigning to the asynchronous packet the transmission of a command status to the modules. In addition, when a request for the right of use of the high-speed serial bus is issued by at least two modules or apparatuses, unfair arbitration is performed so that the right of use of the fast serial bus is provided first for a specific module or apparatus selected among those requesting the right of use of the bus. As a result, once the transmission of image data is started the right of use of the bus can be guaranteed for the specific module or apparatus until the transmission is terminated. Therefore, even when a command status and color image data, the amount of which is comparatively large, are to be transmitted, or when a conflict exists among a plurality of jobs that require the transmission of image data, image data can be constantly transmitted at a high speed by using one serial bus, and the image data transmission end time can be guaranteed.

According to the embodiment, provided are determination means for determining whether a plurality of jobs, including the transmission of image data, can be executed at the same time; and image data transmission control means for, when the determination means determines that the plurality of jobs, including the transmission of image data, can be executed at the same time, allocating different isochronous packets for the jobs in order to simultaneously perform the transmission of image data for these jobs. Therefore, in addition to the above effects, the image data can be simultaneously transmitted in real time to the modules or the apparatuses.

According to the embodiment, the arbiter performs unfair arbitration to provide the right of use of the fast serial bus first for a module or apparatus that obtained the right of use of the bus for the preceding cycle. As a result, once the transmission of image data is begun the right of use of the bus can be guaranteed for that module or apparatus until the transmission is terminated. Therefore, even when a command status and color image data, the amount of which is comparatively large, are to be transmitted, or when a conflict exists among a plurality of jobs that require the transmission of image data, image data can be constantly transmitted at a high speed by using one serial bus, and the image data transmission end time can be guaranteed.

According to the embodiment, a module or apparatus that transmits image data issues a bus reservation request to the arbiter before the start of the transmission, and also issues a bus reservation cancellation request to the arbiter at the termination of the transmission. When the module or apparatus that issued the bus reservation request issues a request for the right of use of the fast serial bus during a period extending from the time the bus reservation request was issued until the bus reservation cancellation is received, the arbiter performs unfair arbitration to provide the right of use of the fast serial bus first for the requesting module or apparatus. As a result, once the transmission of image data if started the right of use of the bus can be guaranteed for that module or apparatus until the transmission is terminated. Therefore, even when a command status and color image data, the amount of which is comparatively large, are to be transmitted, or when a conflict exists among a plurality of jobs that require the transmission of image data, image data can be constantly transmitted at a high speed by using one serial bus, and the image data transmission end time can be guaranteed.

According to the embodiment, a predetermined number of isochronous packets are bus reservation channels. Provided is a bus reservation means for, when a bus reservation request is received, employing one of the bus reservation channels as a channel dedicated for the module or apparatus that issued the bus reservation request. Therefore, once a bus reservation request is accepted, thereafter the right of use of the fast serial bus can be constantly obtained. As a result, even when a conflict exists among a plurality of image data transmission jobs, image data can be transmitted constantly and at a high speed.

According to the embodiment, the arbiter regards, as targets for fair arbitration, a bus reservation channel that is not dedicated to a specific module or apparatus and an isochronous packet for a channel other than the bus reservation channel. Therefore, the channels that are not used for fair arbitration can be effectively utilized, so that the image data can be transmitted as constantly and as fast as possible.

According to the embodiment, included in a plurality of modules or apparatuses are modules or apparatuses that have different processing speeds, and the image processing apparatus or system includes change means for changing the number of isochronous packets used for the transmission of image data in accordance with the processing speed. Therefore, in accordance with the current image data transmission state, the image data can be transmitted as constantly and fast as possible.

According to the embodiment, included in a plurality of modules are modules that have different processing speeds, and the processing speed of the module that has the lowest transmission speed is used for the transmission of image data. Therefore, an apparatus that has a higher transmission speed supports the low transmission speed for compatibility, so that the image data can be transmitted as constantly and fast as possible.

What is claimed is:

1. A job execution apparatus comprising:
   a discrimination unit adapted to discriminate whether a communication unit is available for a plurality of jobs; and
   an execution unit adapted to execute the plurality of jobs, if said discrimination unit discriminates that the communication unit is available for the plurality of jobs, and to execute one of the plurality of jobs with a smallest data amount in preference to a remainder of the plurality of jobs, if said discrimination unit discriminates that the communication unit is not available for the plurality of jobs.

2. An apparatus according to claim 1, wherein said discrimination unit makes a discrimination when a specific job terminates use of the communication unit.

3. An apparatus according to claim 1, wherein the communication unit comprises an IEEE 1394 serial bus.

4. An apparatus according to claim 1, further comprising a print unit adapted to perform printing based on data of the one of the plurality of jobs executed by said execution unit.

5. A job execution method comprising:
   a discrimination step of discriminating whether a communication unit is available for a plurality of jobs; and
   an execution step of executing the plurality of jobs, if said discrimination step discriminates that the communication unit is available for the plurality of jobs, and executing one of the plurality of jobs with a smallest data amount in preference to a remainder of the plurality of jobs, if said discrimination step discriminates that the communication unit is not available for the plurality of jobs.

6. A method according to claim 5, wherein said discrimination step makes a discrimination when a specific job terminates use of the communication unit.

7. A method according to claim 5, wherein the communication unit comprises an IEEE 1394 serial bus.

8. A method according to claim 5, further comprising a print step of performing printing based on data of the one of the plurality of jobs executed in said execution step.

* * * * *

UNITED STATES PATENT AND TRADEMARK OFFICE
CERTIFICATE OF CORRECTION

PATENT NO. : 6,581,118 B2
DATED : June 17, 2003
INVENTOR(S) : Hiroyoshi Yoshida

It is certified that error appears in the above-identified patent and that said Letters Patent is hereby corrected as shown below:

Column 1,
Line 20, "However;" should read -- However, --.

Column 6,
Line 35, "accordance-with" should read -- accordance with --.

Column 9,
Line 6, "The-isochronous" should read -- The isochronous --.
Line 11, "one-tone" should read -- one-to-one --.

Column 12,
Line 3, "parent-" should read -- parent --.
Line 4, ""declared" should read -- declared --.

Column 15,
Line 32, "to," should read -- t0, --.

Column 23,
Line 56, "node b)," should read -- node D), --.

Signed and Sealed this

Twenty-seventh Day of January, 2004

JON W. DUDAS
*Acting Director of the United States Patent and Trademark Office*